United States Patent [19]

Kurihara et al.

[11] Patent Number: 5,121,486
[45] Date of Patent: Jun. 9, 1992

[54] NETWORK CONTROL SYSTEM FOR DYNAMICALLY SWITCHING A LOGICAL CONNECTION BETWEEN AN IDENTIFIED TERMINAL DEVICE AND AN INDICATED PROCESSING UNIT

[75] Inventors: Jun'ichi Kurihara, Mitaka; Toshio Hirosawa, Machida; Minoru Shibamiya, Yokohama, all of Japan

[73] Assignee: Hitachi, Ltd, Tokyo, Japan

[21] Appl. No.: 272,936

[22] Filed: Nov. 18, 1988

[30] Foreign Application Priority Data

Nov. 20, 1987 [JP] Japan .......................... 62-292024
Feb. 3, 1988 [JP] Japan .......................... 63-21959

[51] Int. Cl.⁵ ...................... G06F 11/20; G06F 11/34
[52] U.S. Cl. .................... 395/325; 395/575; 364/229; 364/229.4; 364/230; 364/238.1; 364/261.1; 364/931.4; 364/942; 364/942.1; 364/942.3; 364/942.5; 364/DIG. 1; 364/DIG. 2; 371/9.1
[58] Field of Search ... 364/200 MS File, 900 MS File; 371/9.1

[56] References Cited

U.S. PATENT DOCUMENTS

| | | | |
|---|---|---|---|
| 4,133,027 | 1/1979 | Hogan | 364/187 |
| 4,351,023 | 9/1982 | Richer | 364/187 |
| 4,443,849 | 4/1984 | Ohwada | 364/200 |
| 4,494,189 | 1/1985 | Bean et al. | 364/200 |
| 4,507,751 | 3/1985 | Gawlick et al. | 364/900 |
| 4,628,508 | 12/1986 | Sager et al. | 371/9 |
| 4,631,661 | 12/1986 | Eibach et al. | 364/200 |
| 4,653,048 | 3/1987 | Anderson et al. | 370/94 |
| 4,751,702 | 6/1988 | Beier et al. | 371/9 |
| 4,797,884 | 1/1989 | Yalowitz et al. | 371/9 |
| 4,819,232 | 4/1989 | Krings | 371/9 |
| 4,823,256 | 4/1989 | Bishop et al. | 364/200 |
| 4,941,087 | 7/1990 | Kap | 364/200 |
| 5,043,866 | 8/1991 | Myre, Jr. et al. | 364/200 |

OTHER PUBLICATIONS

Donnan et al., "Symchronous data link control: A perspective", IBM systems journal, vol. 13, No. 2, 1974, pp. 140–162.

Primary Examiner—Thomas C. Lee
Assistant Examiner—Krisna Lim
Attorney, Agent, or Firm—Antonelli, Terry, Stout & Kraus

[57] ABSTRACT

A control method and apparatus for dynamically switching a logical session in an information processing system having a network control system configuration in which a plurality of terminal devices are connected to a plurality of processing units via at least one communication control processer. The communication control processor includes storage area for storing histories of command data transactions corresponding to the respective terminal devices, and retrieves the histories of command data transactions of the terminal devices connected logically to a processing unit to be replaced when switching from the processing unit to be replaced to another central processing unit is performed, delivers to the processing unit to be replaced command data to disconnect logical connective relationship from the processing unit to be replaced, and establishes logical connective relationship to the replacing processing unit, and for automatically delivering the retrieved histories of the command data transactions to the replacing processing unit.

17 Claims, 18 Drawing Sheets

FIG. 3

| | CPUTAB 212 | | |
|---|---|---|---|
| 240 — R | | NOCPU | — 241 |
| 242 — CPUID | V (243) | CHNGCPU | — 244 |
| | | | |
| CPUID | V | CHNGCPU | |

FIG. 4

| APLTBL 213 | |
|---|---|
| | NOENT — 246 |
| 247 — APLID | CPUID — 248 |
| | |

FIG. 11

ITEM NO.

| | FUNC-TIONS | COMMAND DATA FORMS | REMARKS |
|---|---|---|---|
| 1 | DEFINITION OF RE-PLACING CPU | CHNGCPU△CPUID, ALTCPU | CPU REPLACING CPUID CPU IS ALTCPU |
| 2 | ENABLE CPU | ENBLCPU△CPUID | CONNECTION TO CPU INDICATED BY CPUID IS ENABLED |
| 3 | DISABLE CPU | DSBLCPU△CPUID | CONNECTION TO CPU INDICATED BY CPUID IS DISABLED |
| 4 | SWITCH CPUs | TRSFR | LOGICAL SESSION ESTABLISHED WITH DISABLED CPU IS TEMPORARILY INTERRUPTED AND LOGICAL SESSION IS NEWLY ESTABLISHED WITH REPLACING CPU |
| 5 | ADDITION OF ENTRIES TO CONNECTION MANAGING TABLE | ADDCPU△CPUID, ALTCPU | ENTRIES ARE ADDED TO CPUTAB  CPUID···ENTERED CPU  ALTCPU···REPLACING CPU |
| 6 | ELIMINATE ENTRIES FROM CONNECTION MANAGING TABLE | DLTCPU△CPUID | CPU INDICATED BY CPUID OPERAND ARE ELIMINATED FROM CPUTAB |
| 7 | ENTER & CHANGE APPL. ID | APL△APLID, CPUID | APLID, CPUID ARE STORED IN APLTBL |
| 8 | ELIMINATE APPL. ID | DLTAPL△APLID | ENTRIES INDICATED BY APLID ARE ELIMINATED FROM APLTBL |

NETWORK CONTROL SYSTEM FOR DYNAMICALLY SWITCHING A LOGICAL CONNECTION BETWEEN AN IDENTIFIED TERMINAL DEVICE AND AN INDICATED PROCESSING UNIT

BACKGROUND OF THE INVENTION

The present invention relates to a control method and apparatus for switching between central processing units in an information processing system, and more particularly to a control method and apparatus capable of switching a session from one central processing unit to another without influencing the operation of terminal devices in an information processing system constituted by a network control system.

Recently, there is an information processing system constituted by a network control system in which a communication environment is set without stopping the whole information processing system, as is disclosed, for example, in Japanese Patent Unexamined Publication No. 61-139859.

When there occur additions to and changes in the communication environment, the technique disclosed in the publication is intended to stop only a communication managing program in the information processing system to cope with the additions and changes without stopping the whole information processing system. Namely, the technique is intended to perform system formation partially, but it does not disclose switching from one central processing unit to another by a communication control processor which is connected to those central processing units in a network control system configuration.

As an information processing system configuration has become large-scaled and complicated, a process has become prevalent in which a group of central processing units copes with newly occurring demands for calculations and processing operations. Such an information processing system of the type which has a network system configuration including a plurality of central processing units, a plurality of communication control processors, and a plurality of terminal devices, as mentioned above, must be operated efficiently by greatly saving its consumed power (power saving operation). More specifically, in midnight time zones and/or holidays in which the load on the information processing system will decrease, it is desirable to stop several of the plurality of central processing units and to further restart the remaining central processing units when the load increases in order to cope with the increased demand for processing operations. However, the service provided by the information processing system to the users who use the information processing system by means of terminal devices in a time sharing system (TSS) and/or on an on-line basis must not be deteriorated. More specifically, when users use in TSS a first central processing unit, they must not be required to perform any operations to issue a command to log temporarily from a first central processing unit (LOGOFF command) and a command (LOGON command) to log on a second central processing unit (LOGON command). There is no problem if the terminals users can enjoy the services provided by the second central processing unit instead of the first central processing unit without requiring the terminal users to perform those operations. However, such control system has not been proposed in the past.

Recently, to improve the reliability of the system, information processing systems are constructed to have redundancies such as spare devices, spare central processing units and a control system which performs switching from main devices to these spare devices without causing erroneous operations, as is disclosed, for example, in Japanese Patent Unexamined Publication No. 62-17258.

The publication discloses the techniques in which spare devices are prepared at all times in the information processing system. When there occurs a failure in one device, a switching device switches information processing from the defective device to another spare one, and a testing device is allowed to diagnose the defective device. The defective device can be repaired as it is connected to the testing device. However, there are various problems in expanding the devices to be switched to central processing units. The JP-A 62-17258 does not refer to a control system for switching and reexecution of a group of programs which has run at the central processing unit in which a failure occurred to another processing unit. Nor does the publication disclose a control unit which detects the occurrence of failures.

When a failure occurs in a central processing unit in an on-line processing system, general well-known methods of restoring the central processing unit are as follows:

(a) A common use of a group of files between a spare central processing unit and the main central processing unit; and (b) Picking up, in a defective central processing unit, of histories of messages from the respective terminals belonging to the defective central processing unit, and sequential processing of the message histories after restoration of the defective central processing unit.

In the method (a), the operator of the information processing system detects a failure in a central processing unit, and switches the defective central processing unit to a spare one in accordance with the instructions of the operation manager. However, during the time when the main central processing unit operates normally, the spare one is on standby, which is useless. In the method (b), since the state before the failure occurs is restored on the basis of the message histories picked up in the central processing unit, the contents of the files must also be returned to their initial state, and the users at the terminal devices must wait during that restoring operation.

The service provided by the information processing system to the users who use the information processing system through their terminal devices in a time sharing system or on an on-line basis must not be deteriorated. More specifically, when there occurs a failure in any one of a plurality of central processing units, it is desirable to automatically switch the terminal users belonging to the defective central processing unit to another normal one without requiring the terminal users to perform any operations required for the use of the normal processing unit. However, the conventional control systems have not realized such switching system.

SUMMARY OF THE INVENTION

It is a first object of the present invention to provide a control method and apparatus which, in an information processing system having a network system configuration comprising a group of central processing units, a communication control processor and a group of terminal devices, automatically switches one central processing unit which the users use to another without requiring the users to perform any operations.

It is a second object of the present invention to provide a control method and apparatus which, in an information processing system having a network system configuration comprising a group of central processing units, a communication control processor and a group of terminal devices, causes the communication control processor to supervise at all times the operative state of the group of central processing units, and to automatically switch, when it detects a central processing unit at stoppage, the session to the central processing unit at stoppage to another central processing unit without requiring the terminal users which have used the central processing unit at stoppage to perform any operations.

The first object is achieved by a system comprising a plurality of central processing units and a communication control processor (CCP) connected thereto, CCP comprising a memory area for storing histories of message transactions for the respective terminal devices, a control block indicative of which of the central processing units the respective terminal devices use, a control block for storing identification information on central processing units connected to the communication control processor, information on the respective states of those central processing units, and identification information on central processing units which can replace any defective central processing unit, and a control unit for tracing at all times the message transactions between the respective terminal devices and the central processing unit concerned and storing in the above memory area the commands from the terminal devices and the termination messages from the central processing unit concerned. The system further includes a control unit which when a switching command is externally issued to a central processing unit which is to replace the central processing unit used so far (hereinafter referred to as the "replacing central processing unit"), selects the terminal devices which have used the central processing unit to be replaced with another (hereinafter referred to as the "replaced central processing unit"), delivers to the replaced central processing unit a command to disconnect the logical session of the appropriate terminal devices from the replaced central processing unit (LOGOFF command) using information in the memory area for the histories of message transactions, automatically delivers to the replacing central processing unit a command to establish another logical session with the replacing central processing unit (LOGON command), automatically creates a command message which allows the terminal devices to be used continuously on the basis of the histories of the transactions stored in the history memory area and delivers the command message it to the replacing central processing unit.

By the above system, switching from the replaced central processing unit to the replacing central processing unit is achieved without requiring the users at the terminal devices to perform any operations of keying in a series of commands which would otherwise be required for that switching operations.

The control system for dynamically switching a logical session according to the present invention includes a communication control processor between the terminal devices and the central processing units. The communication control processor stores therein the history of the message transactions, and automatically delivers a command message to the replacing central processing unit when switched. Therefore, the operability maintained so far will not be impaired.

The second object of the present invention is achieved by further providing a control unit in the communication control processor for supervising the operation of the group of the central processing units connected to the communication control processor. When the control unit detects that the central processing unit concerned cannot be used any longer or is at stoppage due to some failure, it marks in the control block corresponding to that defective central processing unit that same cannot be used any longer, and starts to operate session switching control means.

The session switching control means includes means for selecting the terminal devices which used the defective central processing unit, automatically delivering to the replacing central processing unit a data stream comprising a command to establish a session (LOGON command) with the replacing central processing unit by using the information stored in the memory area for the histories of the previous message transactions, automatically creating a data stream of a command message for allowing the terminal devices to be used continuously on the basis of the histories of the transactions stored in the memory area, and delivering the command message to the replacing central processing unit.

By such construction, even if any failure occurs in any particular one of the group of the central processing units to stop the particular central processing unit, the terminal devices users will be switched to another central processing unit without requiring the users to perform any operations to key in a series of commands which would otherwise be required for that switching operation.

BRIEF DESCRIPTION OF THE DRAWINGS

FIG. 3 illustrates the contents of a managing table indicative of the respective states of the central processing units;

FIG. 4 illustrates the contents of a managing table indicative of application programs and the corresponding central processing units which process the application programs;

FIG. 11 illustrates the kind of commands issued from command unit 205 of FIG. 1 to a command interpretation and execution program section;

DESCRIPTION OF THE PREFERRED EMBODIMENTS

Preferred embodiments of a control method and apparatus for dynamically switching a logical session in an information processing system having a network control system configuration according to the present invention will now be described in more detail.

First, a first embodiment of the present invention will be described with reference to FIGS. 1-14.

The first embodiment provides a control method and apparatus which switches a central processing unit used so far to another one without requiring the terminal users to perform any operations which would otherwise be required for that switching operation.

Figure 1:
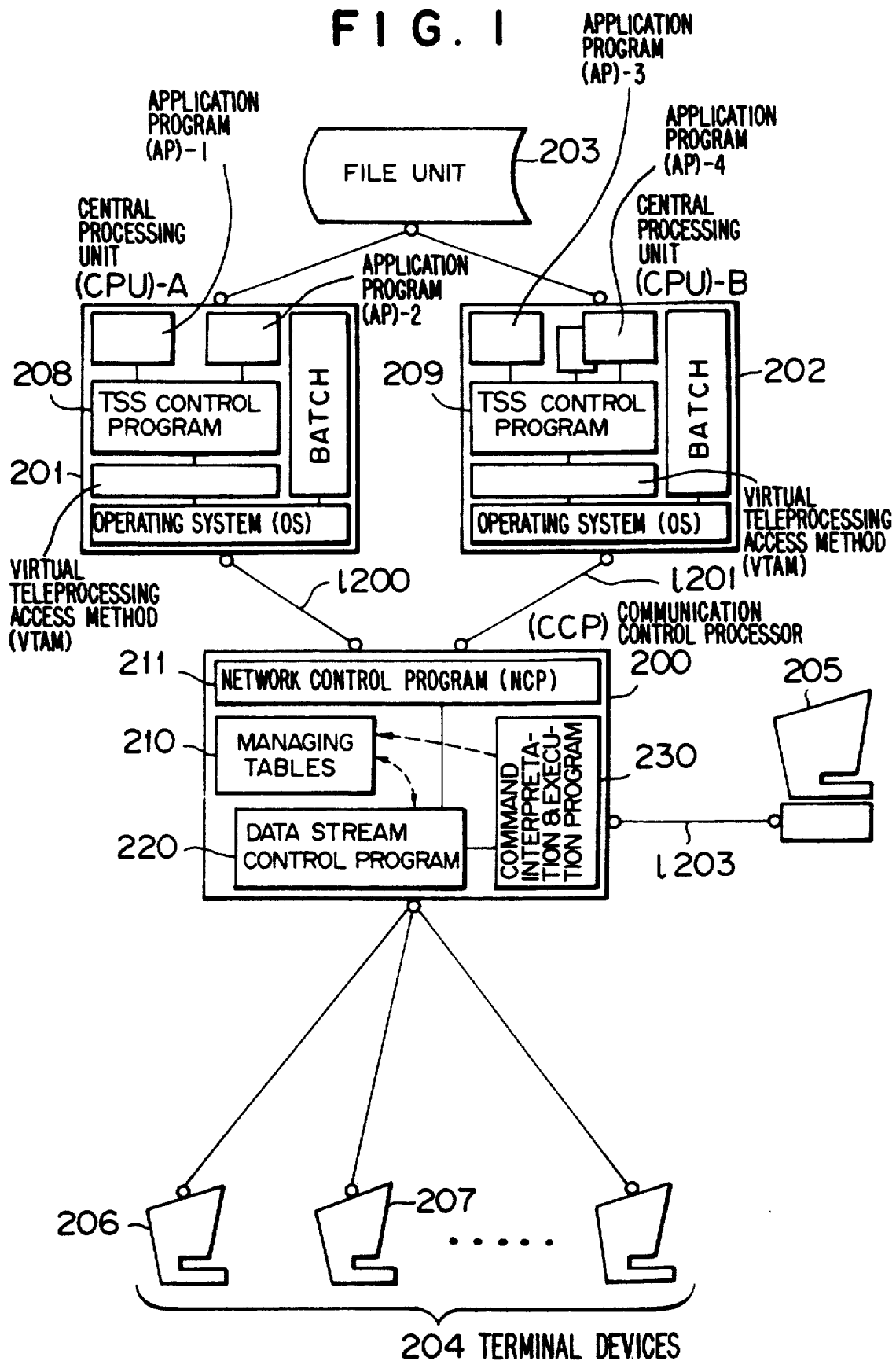
FIG. 1 is a scheme of a first embodiment of a control apparatus for dynamically switching a logical session according to the present invention.

FIG. 1 is a scheme of a control apparatus for dynamically switching a logical session according to the particular embodiment. In FIG. 1, a network configuration is composed of a plurality of central processing units (CPUs) (here, for example, two CPUs; namely, CPU-A, CPU-B) 201, 202, a communication control processor (CCP) 200 and a group of terminal devices 204. Central processing units CPU-A and CPU-B are also connected to a file unit 203. The CPUs and CCP each include a sub-CPU, a ROM and a RAM which are each shown as a functional block in FIG. 1.

In CPU-A and CPU-B, TSS control programs 208 and 209 operate under an operating system (OS) and a virtual teleprocessing access method (VTAM), and application programs $AP_1$ and $AP_3$ operate in correspondence to terminal devices 206 and 207, respectively.

In CCP 200, a network control program (NCP) 211 which manages network transmission procedures operates to provide transmission control of the communication procedures comprising high-level data link control (HDLC) and synchronous data link control (SDLC) procedures. For the virtual teleprocessing access method and the communication procedures, see, for example, "Synchronous Data Link Control: A Perspective", IBM Systems Journal, Vol. 13, No. 2, 1974.

In the above arrangement, the terminal device 206 can freely access CPU-A 201 and CPU-B 202 via CCP 200 and lines 1 200 and 201, respectively, to thereby operate application programs $AP_1$-$AP_4$. As just described above, the state in which, for example, the terminal device 206 operates an application program in CPU-A 201 via CCP 200 is generally referred to as "a logical session is established". Therefore, as mentioned above, when the terminal device 206 uses $AP_1$, it establishes a logical session with TSS control program 208 in CPU-A 201.

The control system for dynamically switching a logical session according to the particular embodiment is realized by a group of managing tables 210, a data stream control program 220 and a command interpretation and execution program 230 in CCP 200. Now, a control system for dynamically switching a logical session according to the particular embodiment will be outlined with reference to FIG. 1 and the structure and operation of the system will then be described in detail with reference to FIGS. 2-14.

In FIG. 1, assume that the user of a terminal device 206 establishes a logical session with the TSS control program 208 in CPU-A 201 via line 1 200. At this time, $AP_1$ is a program for processing a TSS command keyed in by the user at terminal device 206. Now, a case in which CPU-A 201 is stopped, and the TSS users of CPU-A 201 are automatically shifted to CPU-B 202 will be described. In this case, the control system for dynamically switching a logical session according to the particular embodiment will exhibit its effect.

For batch processing, if CPU-A 201 stops providing its services, the subsequent batch processing is automatically executed by CPU-B 202. This process is possible because file unit 203 is connected to both CPU-A and CPU-B.

Data stream control program 220 stores in the group of managing tables 210 the histories of message transactions processed between the respective terminal devices and the central processing unit. In addition to the history of message transaction, managing tables 210 include a central processing unit state managing table indicative of the respective states of the central processing units connected to the communication control processor, a managing table indicative of identification data on application programs and the corresponding central processing units which process the application programs, a terminal device state managing table and a message buffer. These managing tables will be also described later with reference to FIGS. 2-5.

Command interpretation and execution program 230 of FIG. 1 starts to operate when command data issued by a command unit 205 is received via line 1 203 and the operation of program 230 will be described in detail in FIGS. 11-14.

When command interpretation and execution program 230 interprets command data from command unit 205 and stores in managing tables 210 control data on the command data, it cooperates with data stream control program 220 to realize the control system which dynamically switches a logical session according to the particular embodiment.

When terminal device 206 establishes a logical session with TTS control program 208 in CPU-A 201, and is executing TSS command $AP_1$, and if it receives from command unit 205 a command that CPU-A 201 should be invalidated, command interpretation and execution program 230 turns off a valid flag in the appropriate entry in the central processing unit state managing table (see FIG. 3) of managing tables 210. Thus, a logical session cannot be established any longer with TSS control program 208 of CPU-A 201.

When command unit 205 issues the command "execute switching", commands interpretation and execution program 230 uses data stream control program 220 and managing tables 210 to automatically create a command to disconnect terminal devices 204 which have established a logical session with the TSS control program in CPU-A 201 (LOGOFF command), stores the command in the message buffer and shifts control to network control program NCP 211, which then delivers the command data in the message buffer via line 1 200 to CPU-A 201. Thus, the command data is delivered through the VTAM program to TSS control program 208 to close or disconnect the session of the terminal device corresponding to the appropriate data stream.

Data stream control program 220 stores the message transaction histories corresponding to the respective terminal devices and automatically creates a command to establish a logical session with TSS control program 209 in the replacing CPU-B 202 (LOGON command) by using managing tables 210 which store the state of the respective central processing units, stores the LOGON command in the message buffer, and delivers control to network control program (NCP) 211. Thus network control program 211 delivers the command data in the message buffer via line 1 201 to CPU-B 202. When the command data is delivered to TSS control program 209 via VTAM, the session by the terminal device in the appropriate data stream is established and thereafter $AP_3$ becomes operable.

If a logical session is established with another central processing unit, command interpretation and execution program 230 and data stream control program 220 store command data sequentially in the message buffer using the message transaction histories stored previously. Thus the terminal device concerned is restored to its state immediately before the central processing unit is switched and thereafter can key in commands.

By performing the above mentioned processing operation on all the terminal devices connected to the replaced central processing unit, the logical session is automatically switched.

The structure and operation of the control system for dynamically switching a logical session according to the particular embodiment will now be described in detail with reference to FIG. 2 and the subsequent Figures.

Figure 2:
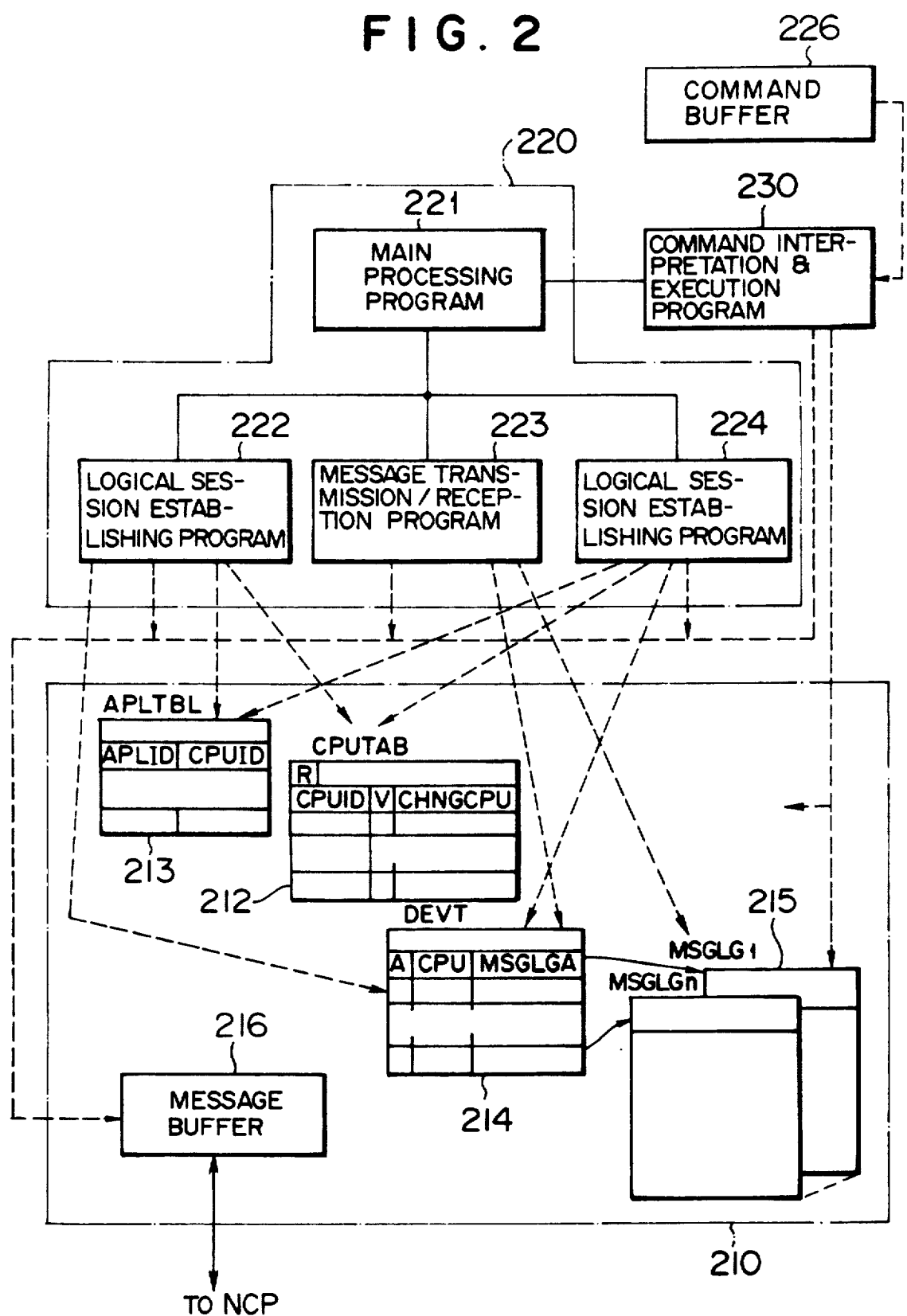
FIG. 2 illustrates a scheme of a group of control programs and a group of managing tables which realize the control system of FIG. 1.

FIG. 2 shows the structure of the group of managing tables 210, data stream control program 220, and command interpretation and execution program 230. The group of managing tables 210 includes a managing table (CPUTAB) 212 which stores the respective states of the central processing units, a managing table (APLTBL) 213 indicative of identification data on application programs and the corresponding central processing unit which process the application programs, a terminal state managing table (DEVT) 214, message transaction history tables ($MSGLG_n$) 215 and a message buffer 216. Each message history table 215 corresponds to a respective one of the terminal devices.

Data stream control program 220 includes a main program 221, a logical session establishing program section 222, a message transmission/reception program section 223, and a logical session termination program section 224. Data stream control program 220 is also accessed by command interpretation and execution program 230. The broken line arrows shown in FIG. 2 mean that the group of processing programs refer to and updata managing tables 210.

FIG. 3 illustrates the configuration of central processing unit state managing table CPUTAB 212 and an entry count (NOCPU) 241 shows the effective number of entries in the table. Reference numeral 240 denotes an R-flag which shows that there is a command issued by command unit 205. Each entry includes a central processing unit name CPUID 242, and a valid flag (V-flag) 243 and a replacing central processing unit name (CHNGCPU) 244. These CPUID 242 and CHNGCPU 244 are information identifying central processing units. CHNGCPU 244 becomes valid when V-flag 243 is off.

FIG. 4 shows the configuration of a managing table (APLTBL) 213 indicative of identification data on application programs and central processing units which processes the corresponding application programs. As in FIG. 3, entry count (NOENT) 246 indicates the number of valid entries in the table. Each entry includes an application program name (APLID) 247 and the corresponding central processing unit name (CPUID) 248. The managing table indicates which of the central processing units an application program, for example TSS control program, can be run in.

Figure 5:
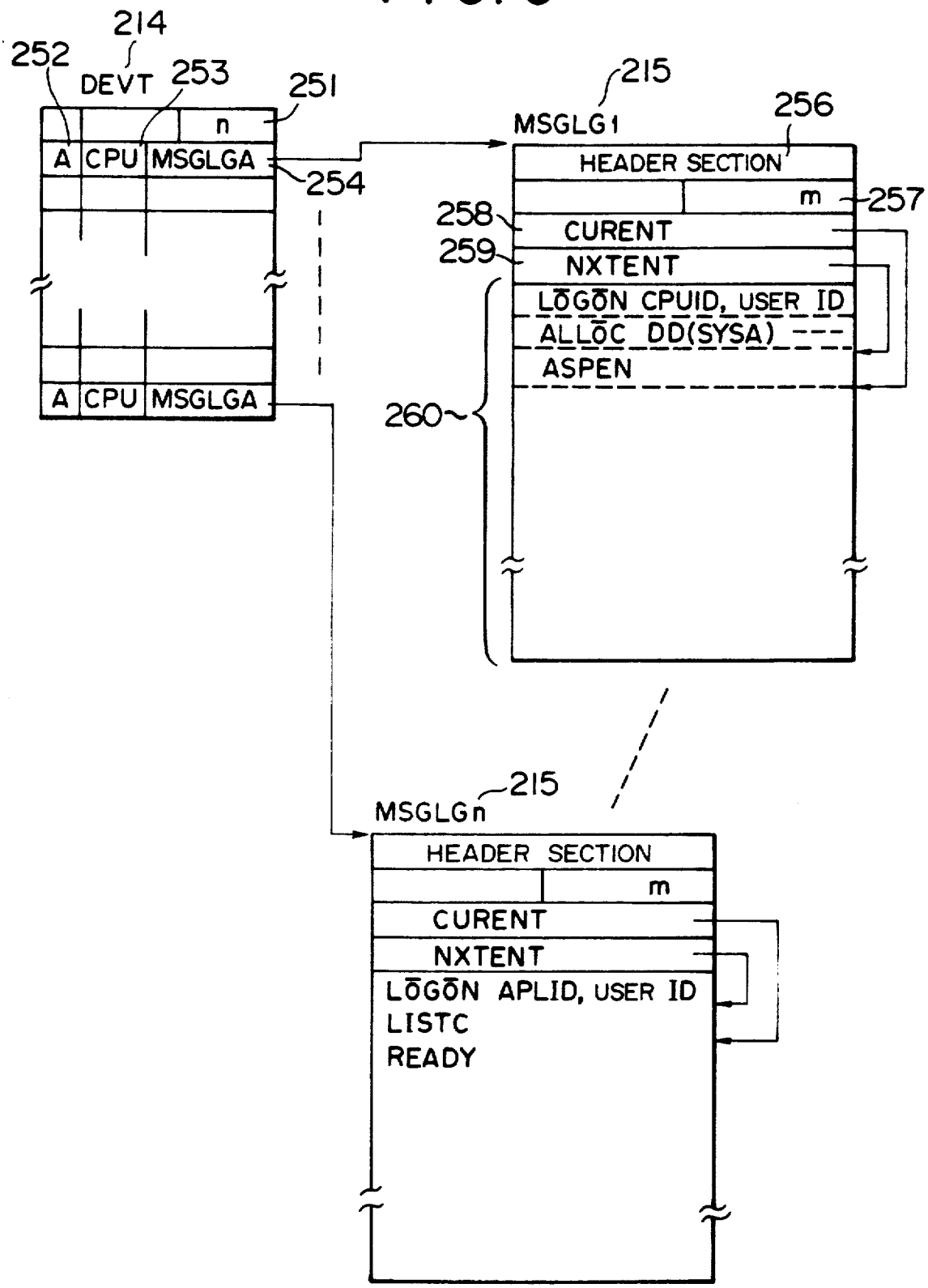
FIG. 5 illustrates the contents of a terminal state managing table and a message transaction history table.

FIG. 5 illustrates the structure of terminal state managing table 214 and message transaction history tables ($MSGLG_1$-$MSGLG_n$) 215 and the relationship between both the managing tables. In the terminal state managing table (DEVT) 214, entry count (n) 251 indicates the number of terminal devices entered in the table. Each entry includes for each terminal unit an active flag (A-flag) 252, the name of central processing unit 253, connected to the terminal devices, and address (MSGLGA) 254 of message transaction history table 215.

Message transaction history tables ($MSGLG_1$-$MSGLG_n$) 215 correspond to the respective entries in table 214. Each table 215 includes a header section 256 in which control information is stored, a command message history count (m) 257, a current entry pointer (CURENT) 258, a next entry pointer 259 and a command message history area 260.

Figure 6:
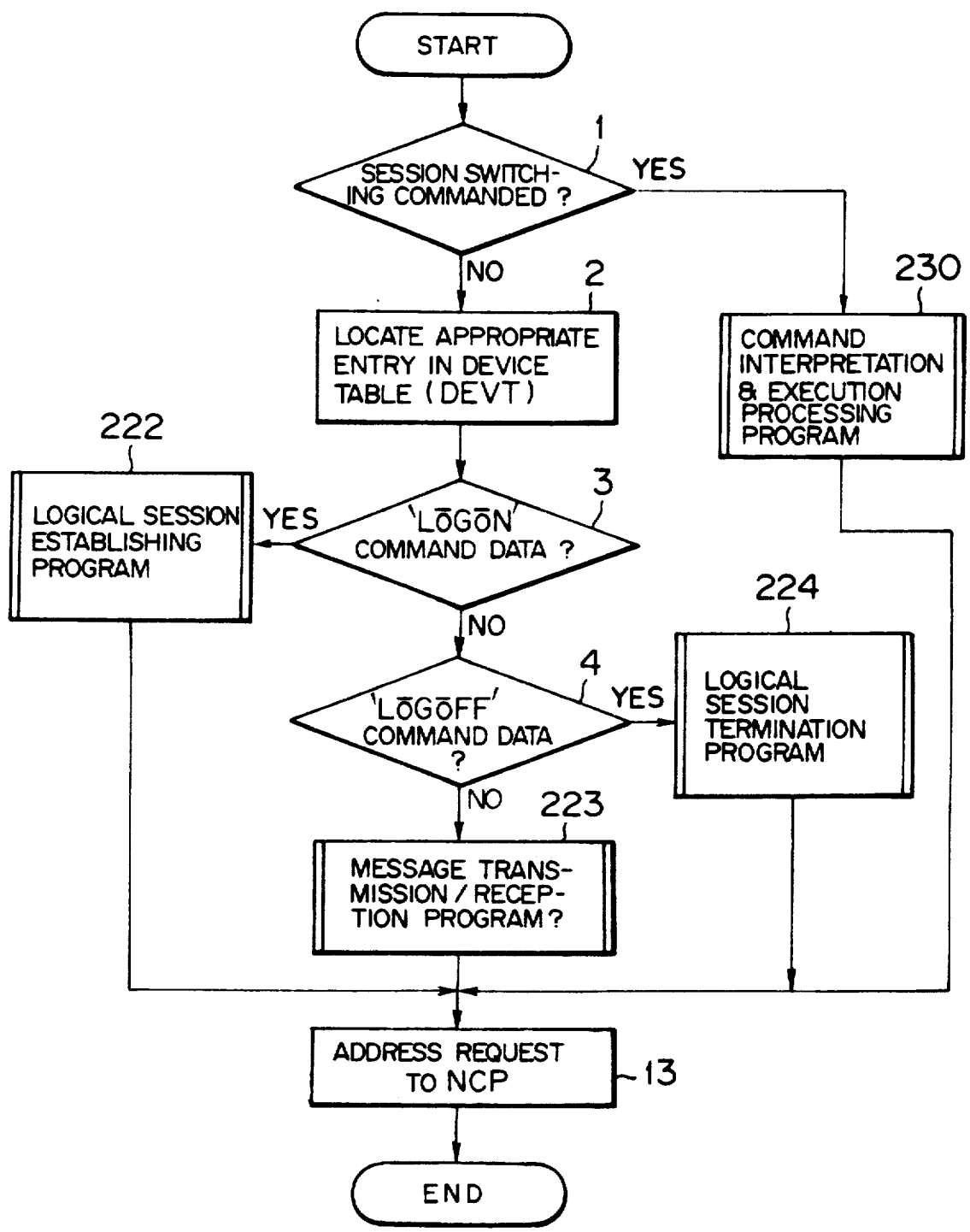
FIG. 6 is a flowchart showing the operation of a main program section.
Figure 7:
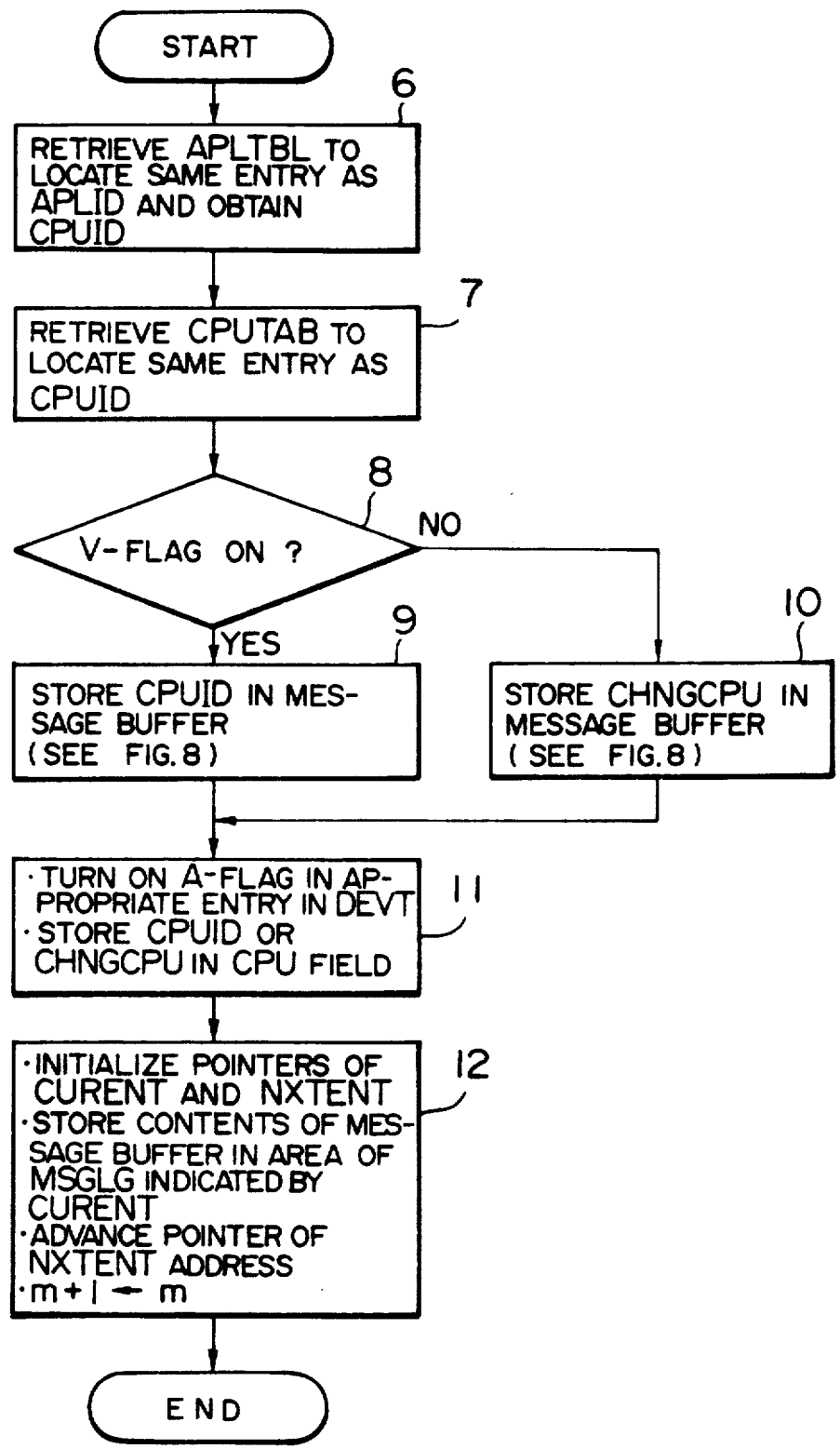
FIG. 7 is a flowchart showing the operation of a logical session establishing program.
Figure 8:
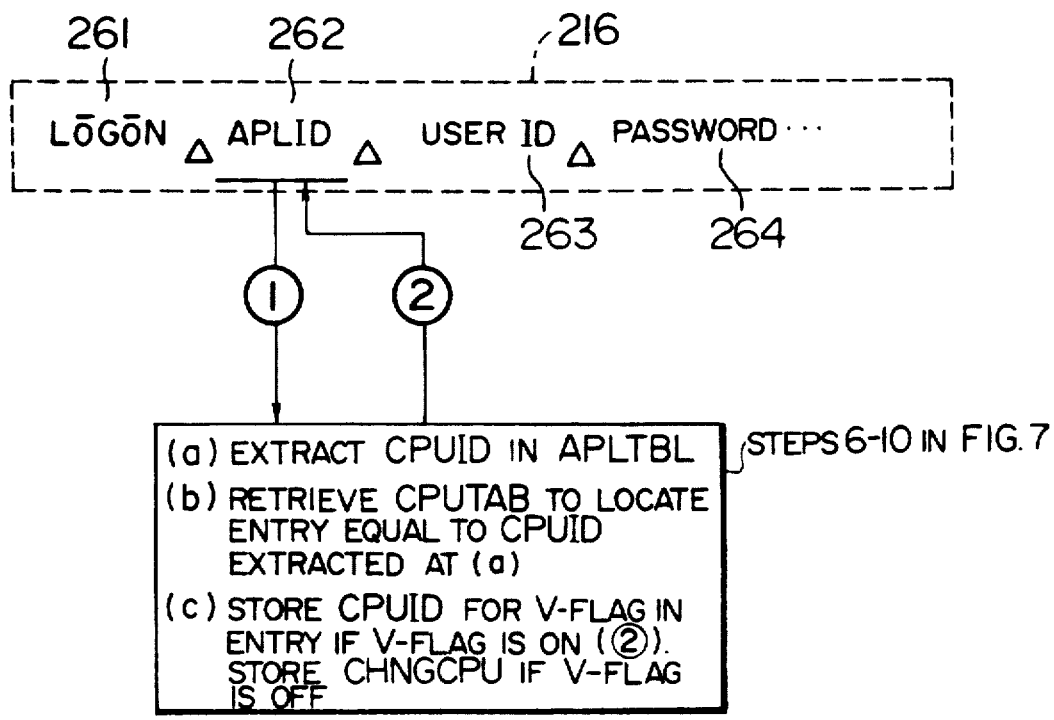
FIG. 8 illustrates a data stream of LOGON commands stored in a message buffer 216 of FIG. 2.
Figure 10:
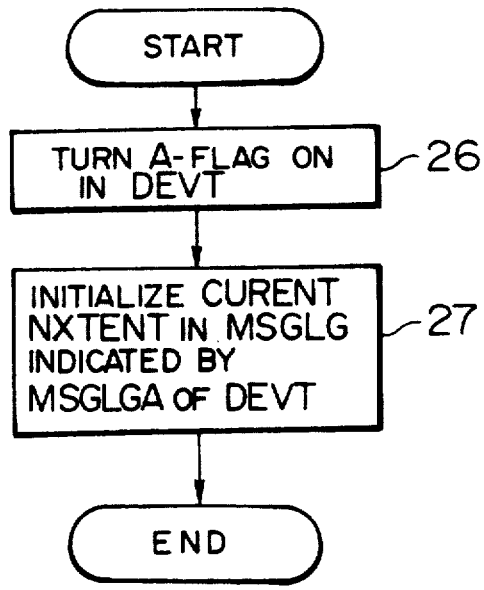
FIG. 10 is a flowchart showing the operation of a logical session termination program section.
Figure 9:
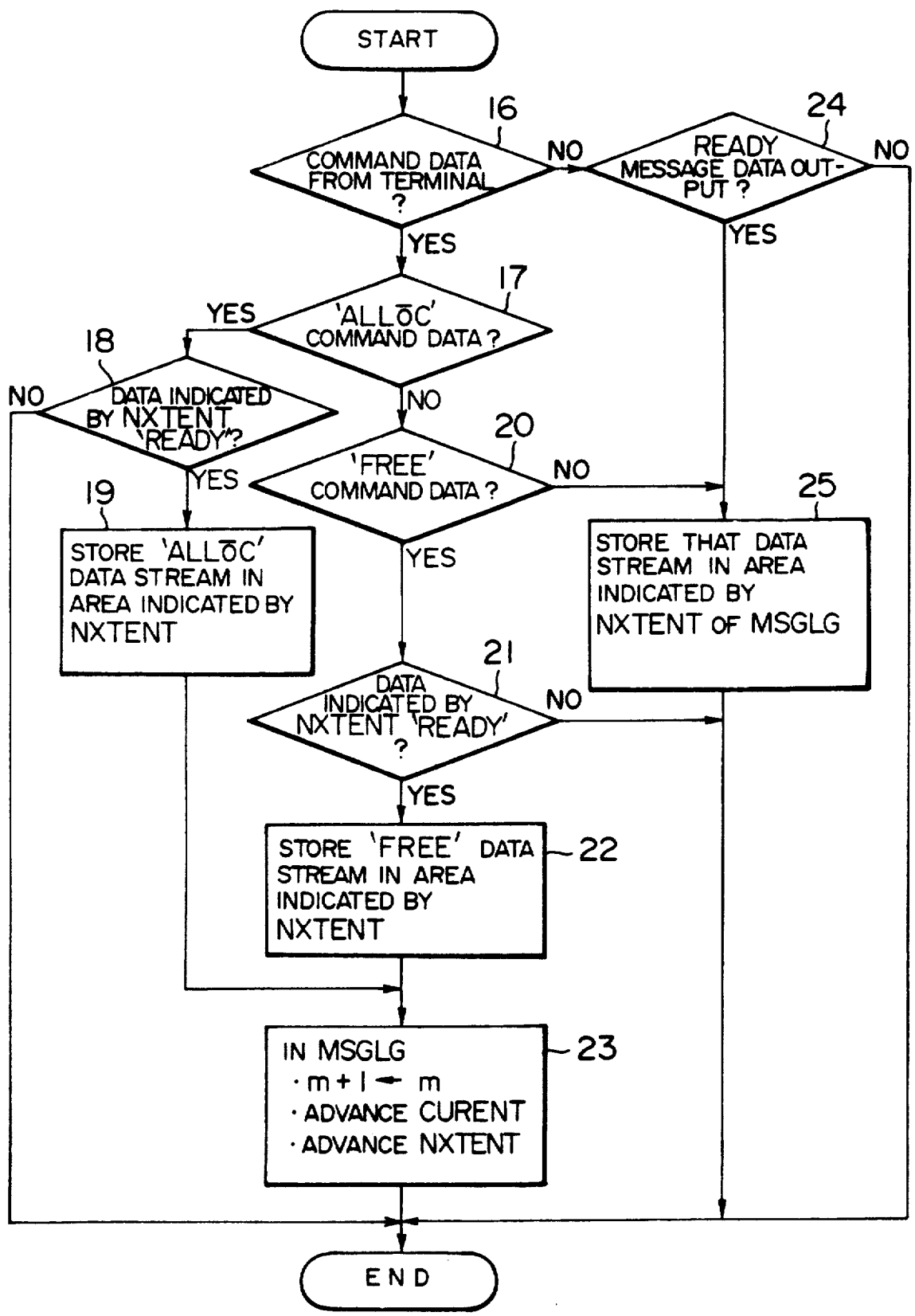
FIG. 9 is a flowchart showing the operation of a message transmission/reception program section.

FIG. 6 is a flowchart showing the operation of main processing program section 221 of data steam control program 220 shown in FIG. 2. FIG. 7 is a flowchart showing the operation of the logical session establishing program section. FIG. 8 illustrates the storage of a data stream of the LOGON command data in message buffer 216. FIG. 9 is a flowchart showing the operation of a message transmission/reception program section. FIG. 10 shows a flowchart showing the operation of the logical session termination program section.

Figure 12:
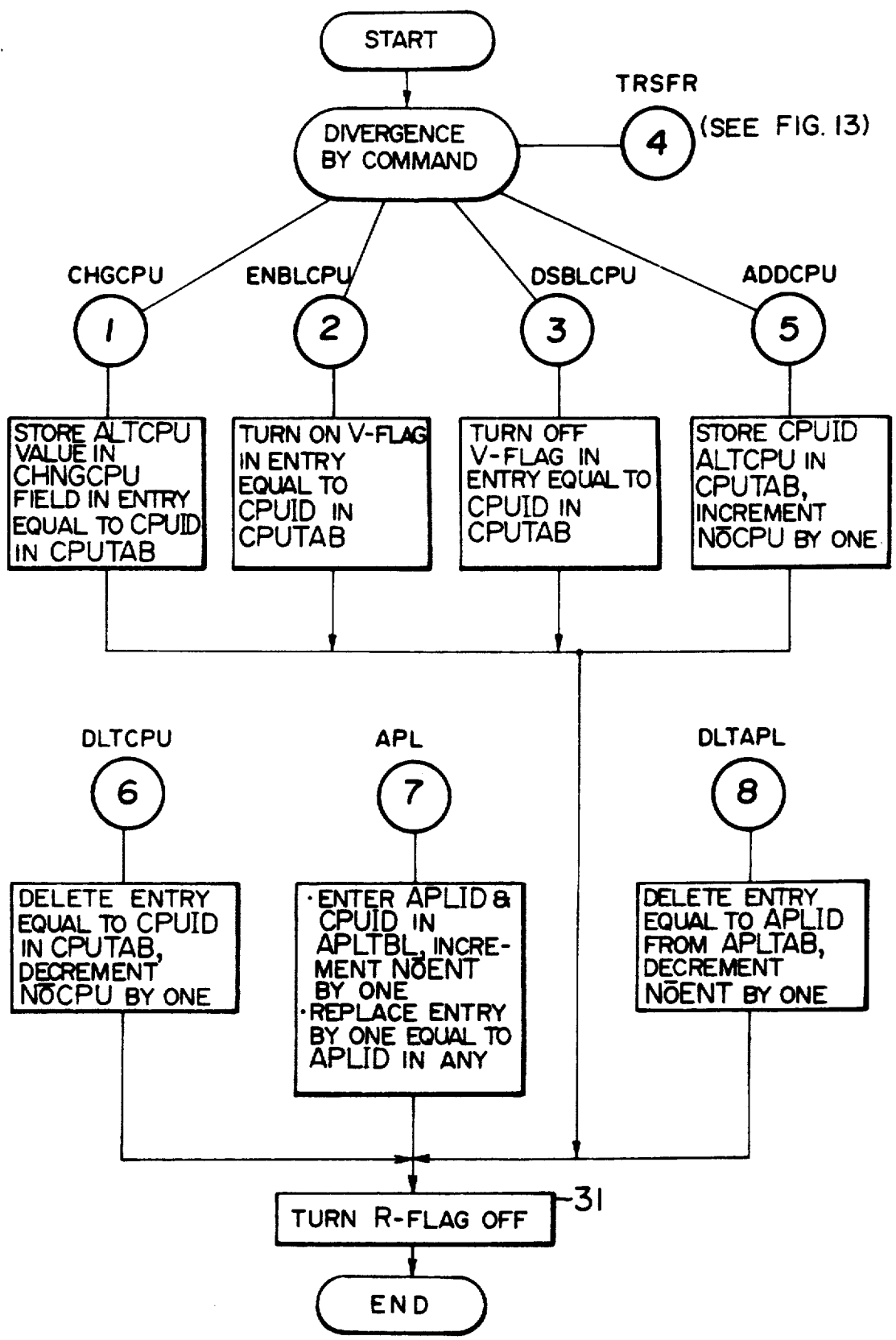
FIGS. 12, 13 and 14 are a flowchart showing the operation of the command interpretation and execution program.
Figure 13:
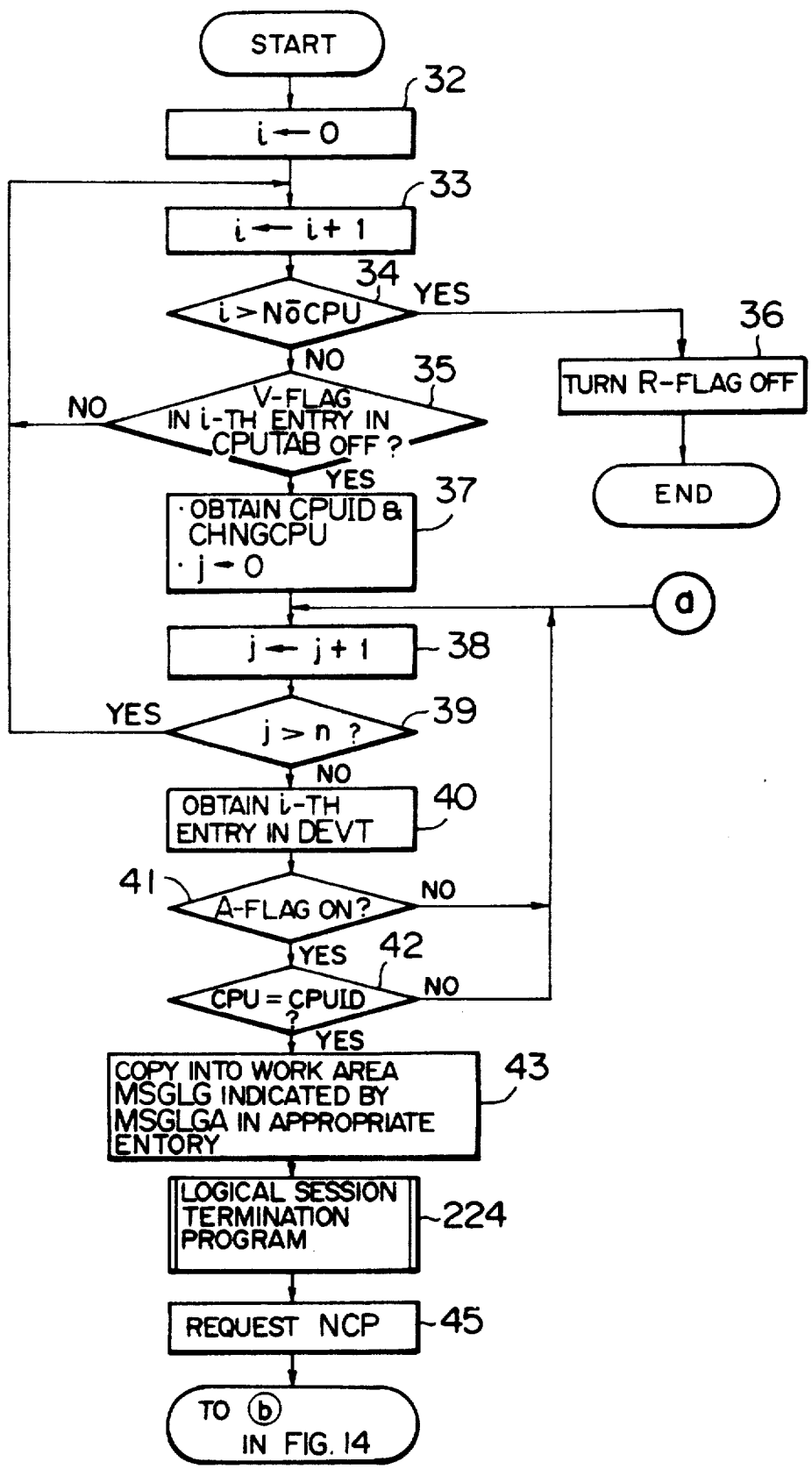
Figure 14:
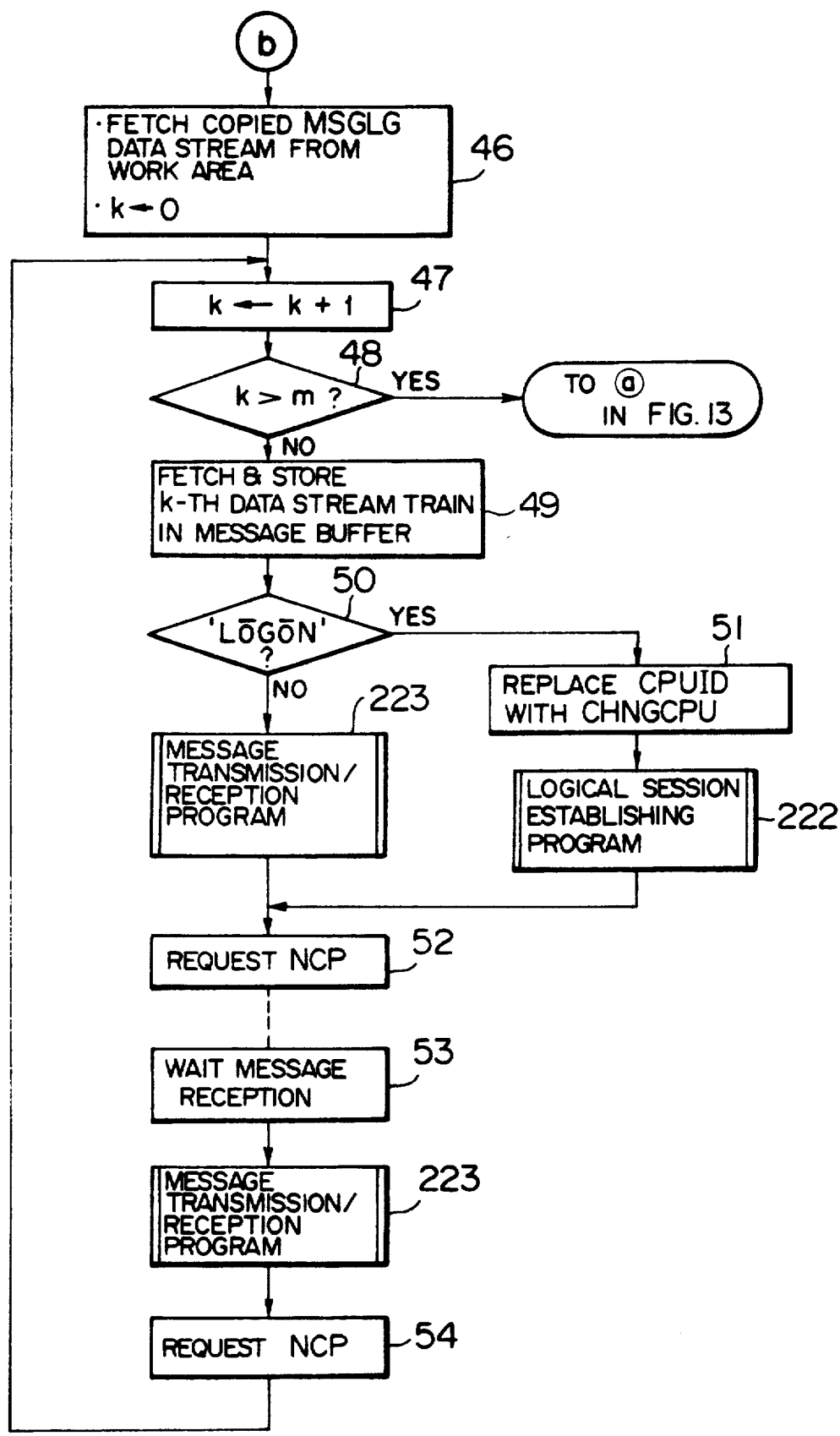

FIG. 11 illustrates the kind of commands issued from command unit 205 to command interpretation and execution program 230 of FIG. 1. FIGS. 12-14 are a flowchart showing the operation of command interpretation and execution program 230.

The operation of the control system for dynamically switching a logical session according to the particular embodiment will now be described in detail with reference to FIGS. 2-14.

Referring to FIG. 6, main program 221 of data stream control program 220 shown in FIG. 2 operates necessarily when there is message communication between terminal device 206 and CPU-A and CPU-B. First, at determination step 1, it is determined whether there is a command from command unit 205. To this end, whether R-flag 240 is on is checked in central processing unit state managing table 212 shown in FIG. 3. If R-flag 240 is on, command interpretation and execution program 230 is executed. This processing will be described later in more detail with reference to FIG. 11 and the subsequent Figures.

If R-flag 240 is off, step 2 and the subsequent steps will be executed. First, terminal state managing table (DEVT) 214 is retrieved, the entry on the terminal device which corresponds to the appropriate data stream is located, the data stream in message buffer 216 is checked for 'LOGON' command data at determination step 3. If the data stream is 'LOGON' command data, control passes to logical session establishing program section 222 to establish a logical session. If not, the data stream is checked for 'LOGOFF' command data at determination step 4. If the data stream is 'LOGOFF' command data, control passes to logical session termination program section 224 to terminate the logical session.

If the data stream is not 'LOGOFF' command data either, control passes to message transmission/reception program section 223 to collect the message transaction history of the appropriate terminal device.

FIG. 7 illustrates a flowchart showing the operation of logical session establishing program section 222. At step 6, the managing table (APLTBL) 213 indicative of identification data on application programs and the corresponding central processing units which process the application programs, shown in FIG. 4, is retrieved to search therefrom the same entry as the value of APLID field 262 in message buffer 216 shown in FIG. 8 to thereby obtain the corresponding central processing unit name (CPUID) 248. Then at step 7, central processing unit state managing table (CPUTAB) 212 is retrieved to locate an entry equal to CPUID 248 obtained at step 6.

At determination step 8, whether V-flag 243 in the appropriate entry is on is checked. If V-flag 243 is on, CPUID 242 is stored in APLID field 262 of FIG. 8. If V-flag 243 is off, the use of the appropriate central processing unit is inhibited and CHNGCPU 244 is stored in APLID field 262. FIG. 8 shows the relationship between steps 6-10 of FIG. 7 and message buffer 216. The values obtained by the processing system according to the particular embodiment will be stored in APLID field 262 in the data stream of LOGON command data. Therefore, it follows that the values stored in APLID field 262 designate TSS control program 208 or 209 of FIG. 1 in a unique manner.

Of course, when the terminal user does not designate APLID field 262, the step 6 of FIG. 7 is executed using CPU 253 in terminal state managing table 214. In that case, a logical session is tried to be established with the central processing unit that the terminal device used previously.

Referring again to FIG. 7, at step 11 an A-flag corresponding to terminal state managing table (DEVT) 214 is turned on, the value obtained by step 9 or 10 is stored in CPU field 253 corresponding to DEVT 214.

Step 12 is to initialize message transaction history table MSGLG 215, the addresses of which table area are determined in correspondence to (MSGLGA) 254. First, the pointers of current entry pointer (CURENT) 258 and next entry pointer (NXTENT) 259 are initialized at the head of the storage area, the contents of message buffer 216 are stored in the area designated by CURENT 258. NXTENT 259 is then advanced to its next position and the history count (m) 257 is incremented by one. Thereafter, at step 13 of FIG. 6, the contents of message buffer 216 are delivered to the corresponding central processing unit by network control program (NCP) 211 to thereby establish a logical session.

FIG. 9 illustrates a flowchart showing the operation of message transmission/reception program section 223. First, at determination step 16, it is determined whether the message is command data from a terminal device. The identity of the message will have been clarified (not shown) when control passes from network control program 211 to the control system for dynamically switching a logical session according to the particular embodiment. If it is command data from a terminal device, only the TSS command message which operates the resource of a computer system continues to be stored in message transaction history table (MSGLG) 215. General TSS commands and other unique commands prepared by the users are temporarily stored in message transaction history table 215, and when the message data indicative of the termination of the TSS command processing, for example, "READY" message data, is output to a terminal device, the data stream of the previously stored general TSS commands and other unique commands data prepared by the users are eliminated from history table 215. This elimination is performed at determination steps 24 and 25. Such processing eliminates the need to reexecute the general TSS commands, which are already processed, after the logical session is switched.

By proceeding to steps 17, 18 and then to step 19, the data stream of 'ALLOC' command data which comprises a resource allocating command is stored in the location indicated by next entry pointer NXTENT 259.

If the command data is 'FREE' command data comprising a resource freeing command, the command data stream is stored at step 22 after passing through determination steps 20 and 21. At step 23 the history count (m) 257 in message transaction history table 216 is incremented by one, and current entry pointer (CURENT) 258 and next entry pointer 259 are advanced to the corresponding next storage areas.

When the processing of message transmission/reception program section 223 is terminated, network control program (NCP) 211 is required to perform transmission/reception at step 13 of FIG. 6 and the data stream of the message buffer is delivered to the central processing unit or terminal devices concerned.

FIG. 10 is a flowchart showing the operation of a logical session termination program section 224. The logical session termination step includes turning off corresponding A-flag 252 in terminal state managing table 214 at step 26, and initializing current entry pointer 258, current entry pointer 259 and history count (m) 257 in message transaction history table 215 indicated by the corresponding MSGLGA 254 of terminal state managing table 214 at step 27.

FIG. 11 illustrates a list of switching commands from command unit 205. In FIG. 11, items 1-3 are commands to correct the respective entries in central processing unit state managing table 212 of FIG. 3. Item 4 is a command to "execute switching". Items 5 and 6 are commands to correct the respective entries in terminal state managing table 214. Items 7 and 8 are commands to require correction to the respective entries in managing table 213 indicative of identification data on application programs and the corresponding central processing units which process the application programs.

FIGS. 12-14 show a flowchart showing the operation of command interpretation and execution program 230 corresponding to the respective commands shown by items 1-8 in FIG. 11. In FIG. 12, the commands designated by items 1-3, 5-8 other than the command "execute switching" (command "TRSFR") shown by item 4 in FIG. 11 correct the corresponding entries in the respective managing tables and turn off R-flag 240 at step 31.

The processing "execute switching" is shown by the operation flowcharts in FIGS. 13 and 14. Referring to FIG. 13, the repetitive count i is initialized at step 32, and the entry in which V-flag 243 is off in central processing unit state managing table 212 is then searched at steps 33-35. If the count i exceeds entry count (NOCPU) 241 at step 34, R-flag 240 is turned off and this processing is terminated at step 36.

If the entry in which V-flag 243 is off is detected, the count j is initialized in order to retrieve terminal state managing table 214. Thereafter, steps 38-54 are repeated until count i exceeds terminal count (n) 251 in terminal state managing table 214.

At step 40 the j-th entry in terminal state managing table 214 is located, and at determination step 41 it is determined whether A-flag 252 is on. If A-flag 252 is off, the terminal device concerned is not used, so that control returns to step 38 to prepare for location of the next entry.

If A-flag 252 is on, it is checked whether the central processing unit used by the terminal device concerned is marked invalid at determination step 42. If the checked data does not represent the identification data (CPUID) 242 on the marked-invalid central processing unit, control returns to process 38.

If the central processing unit marked invalid is used, the processing "execute switching" continues at step 43 and the subsequent steps. First, message transaction history table 215 indicated by MSGLGA 254 in the entry is copied into the work area. The subsequent processing operations use the data in this work area. Of course, logical session terminating program section 224, message transmission/reception program section 223, and logical session establishing program section 222 called by command interpretation and execution program 230 use the original message transaction history table 215.

When preparation is completed at step 43, control passes to logical session terminating program section 224 and the logical session of the terminal device concerned is temporarily terminated. To this end, 'LOG-OFF' command data stream is stored in message buffer 216 and step 224 is called. Next, at step 45, the request that the contents of message buffer 216 be transferred to the central processing unit is addressed to network control program 211.

Control then passes to step 46 of FIG. 14 where the copied command data items on the message transaction history table in the work area are prepared for sequential transmission to the central processing unit concerned.

The transmission of the command data to the central processing unit is performed by repetition of steps 47-54.

First, at step 47, count K is incremented by one, the resulting count is compared with the number of histories m in the work area at determination step 48. If the value m is exceeded, control returns to step 38 of FIG. 13, which means that switching of a logical session for the terminal devices is completed.

At process 49, the k-th command data stream is fetched and stored in message buffer 216. At determination step 50, it is determined whether the data stream is of 'LOGON' command data. As a result, if so, the APLID field (FIG. 8) in message buffer 216 is replaced with the replacing-central processing unit name 244 derived at step 37 (step 51). Thereafter, control passes to logical session establishing program section 222, the history data is stored in the original message transaction history table 215, and at step 52 network control program 211 is requested to transfer command data to the central processing unit. Thus, a logical session is established between the terminal devices and the TSS control program 209 of the central processing unit, namely, CPU-B 202 of FIG. 1, designated by the replacing-central processing unit name 244. This means that switching to the new central processing unit is completed.

As a result of the determination at determination step 50, if the checked data is not the data stream of a 'LOGON' command, namely, if it is the TSS command data stream after the logical session has been established, control passes to message transmission-reception program section 223, the history data is stored in the original message transaction history table 215, and the network control program 211 is requested to transfer the command data to the central processing unit at step 52.

After a response to the transmitted TSS command is awaited at step 53, control again passes to message transmission/reception program section 223, the network control program 211 is requested to transfer a message to the terminal device concerned.

Thereafter, control returns to step 47, and steps 47-54 are repeated until the series of TSS commands of the message transaction history copied in the work area disappears to thereby complete automatic switching of the logical session for the terminal devices. By repetition of step 38 and the subsequent steps, switching of the logical session for all the terminal devices which have used the central processing unit marked invalid is completed.

While in the particular embodiment disclosed herein the command unit 205 is described as issuing a switching command, etc., the present invention is not limited to these details. The commands may be issued by the central processing unit concerned.

As described above, according to the particular embodiment, since the communication control processor connected to a plurality of central processing units includes a control unit which stores therein histories of message transactions corresponding to the respective terminal devices, and which automatically delivers the stored message transactions to a replacing central processing unit when the replaced central processing unit is switched to the replacing central processing unit, automatic switching will be performed satisfactorily between the replaced and replacing central processing units without requiring the users to perform any operations which would otherwise be required for that switching.

A second embodiment of the present invention will now be described with reference to FIGS. 15-20. The same reference numeral is used to denote elements having the same function throughout Figures of the drawings.

The particular embodiment has a structure in which the communication control processor supervises the respective operative states of a plurality of central processing units at all time, and when it detects a central processing unit at stoppage, it automatically switches a session from the central processing unit at stoppage to another without requiring the terminal users to perform any operations.

Figure 15:
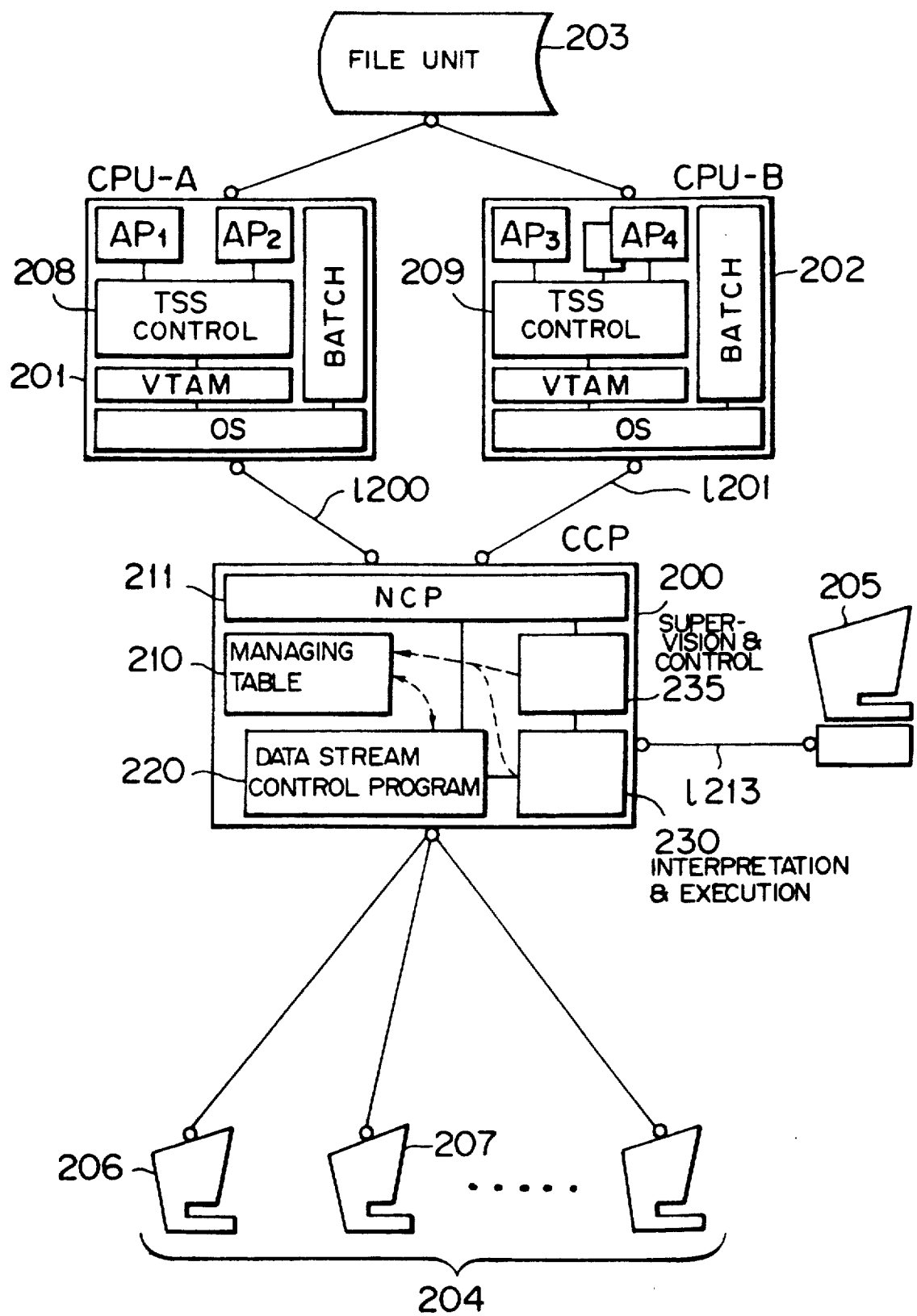
FIG. 15 is a scheme of a session switching control apparatus according to a second embodiment.

FIG. 15 is a scheme of a session switching control system according to the particular embodiment. Compared to the first embodiment of FIG. 1, communication control processor 200 further includes a supervision and control program 235 so that when a CPU-A 201 becomes unable of continuing to provide services due to some failure, it automatically detects that failure and automatically shifts to the TSS users of central processing unit CPU-A 201 to another normal central processing unit CPU-B 202.

Figure 20:
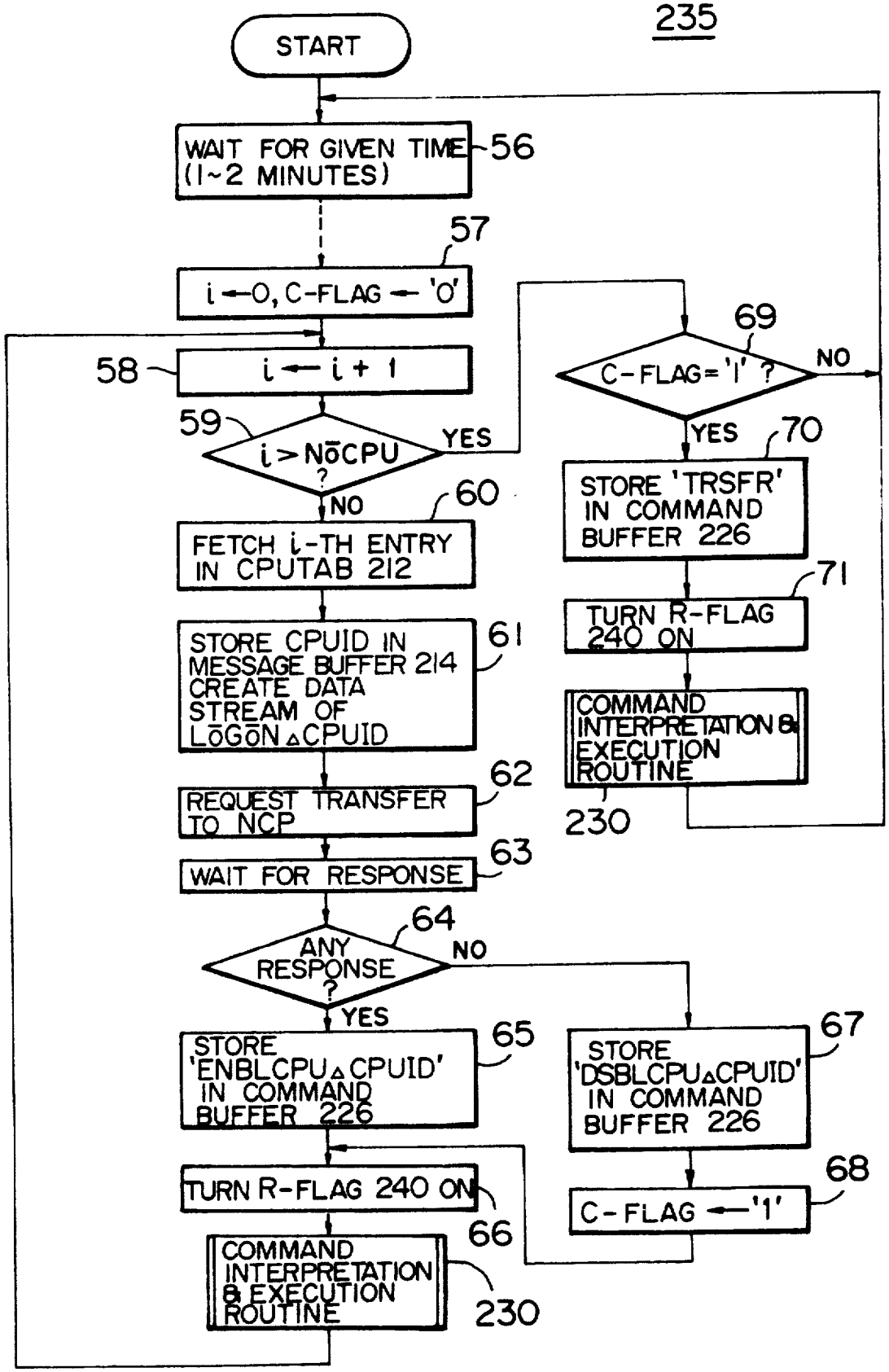
FIG. 20 is a flowchart showing the operation of a supervision and control program.

Supervision and control program 235 is used to supervise at all times the respective states of the central processing units CPU-A and CPU-B connected to the communication control processor 200, and the operation of the program is shown in detail in FIG. 20.

In order to supervise at all times whether the group of central processing units operates satisfactorily, supervision and control program 235 delivers a data stream for examination at predetermined periods of time to the respective central processing units through a network control program (NCP) 211. As a result, if it is determined that a central processing unit stops supply of its services due to failures, the command data is delivered to the command interpretation and execution program thereby start session switching.

Figure 18:
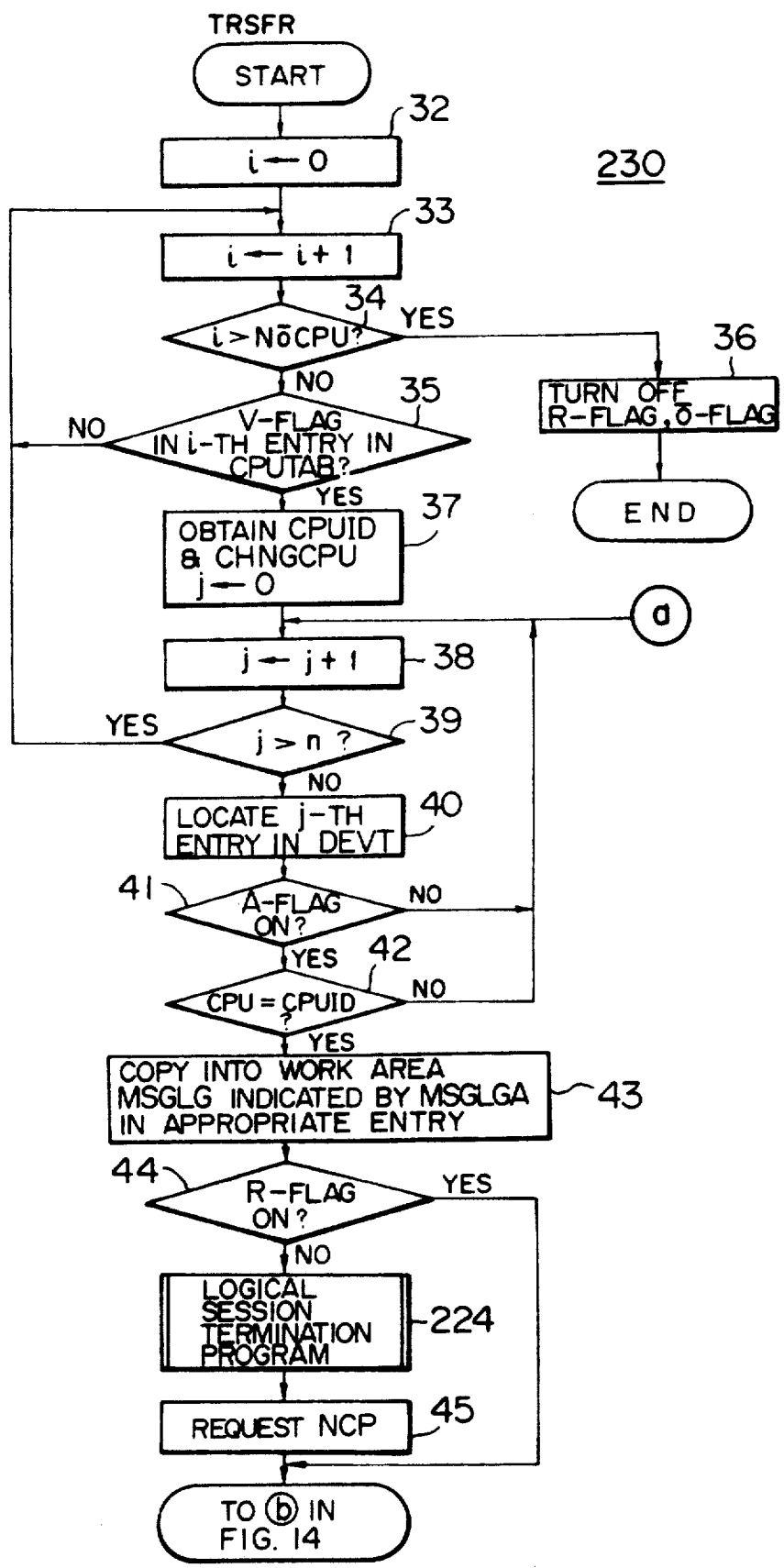
FIGS. 18 and 19 are a flowchart showing the operation of the command interpretation and execution program of FIG. 16.
Figure 19:
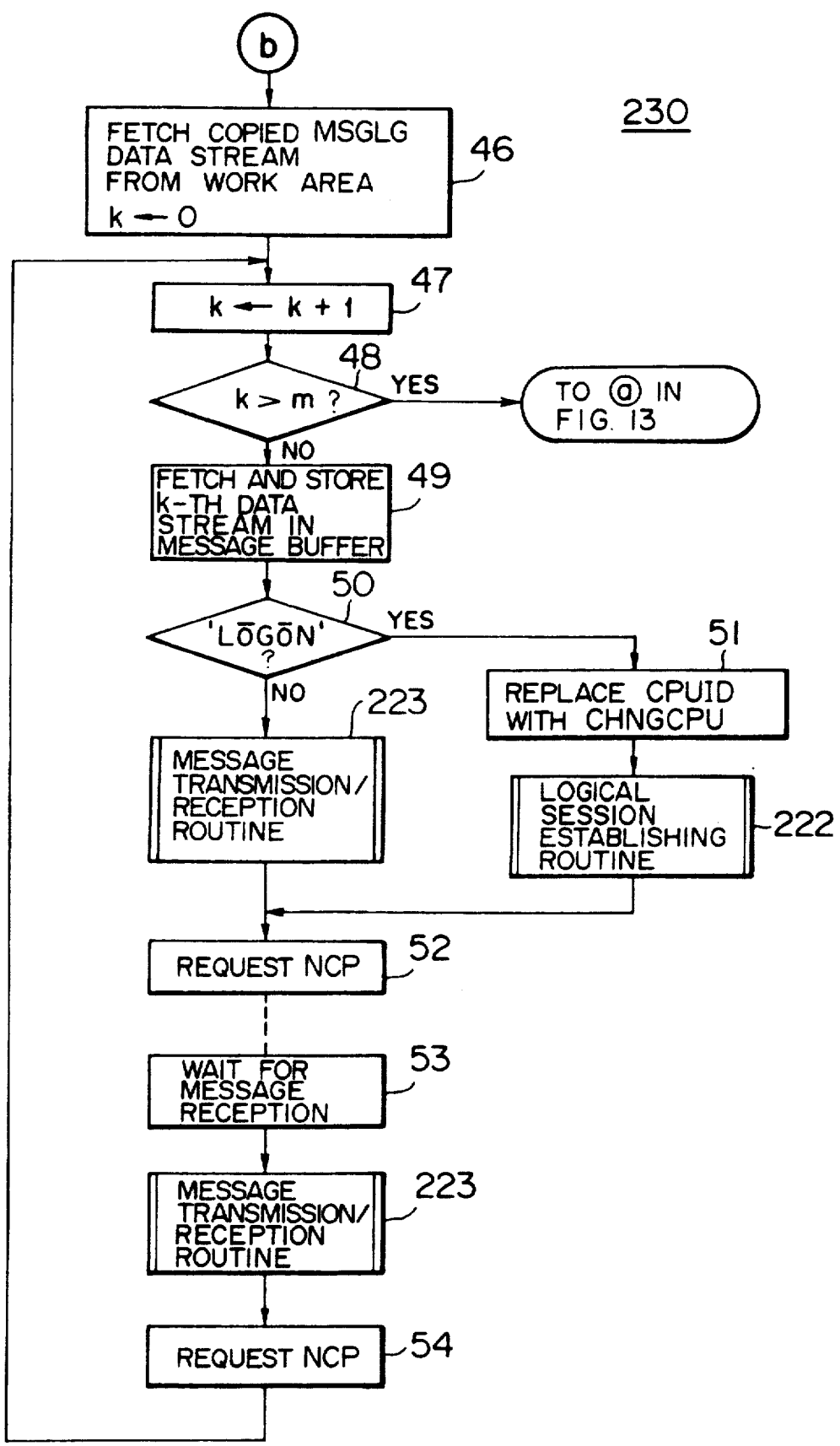

Command interpretation and execution program 230 operates on the basis of the command data issued by supervision and control program 235 to switch the session for the group of terminal devices. The details of the operation of program 230 are shown in FIGS. 18 and 19. Command interpretation and execution program 230 also operates in accordance with the operator's commands through command unit 205. In that case, the command data is delivered via line 1 213.

After command interpretation and execution program 230 interprets the command data from supervision and control program 235 and stores the control data in the group of managing tables 210 on the basis of the command data, it cooperates with data stream control program 220 to realize the control system for dynamically switching a logical session according to the particular embodiment.

If a command is issued which invalidates central processing unit CPU-A 201 from supervision and control program 235 while terminal device 206 establishes a logical session with TSS control program 208 of central processing unit CPU-A 201 and is executing TSS command $AP_1$, command interpretation and execution program 230 turns off a valid flag V of the appropriate entry in the central processing unit state managing table (see FIG. 17) of the group of managing tables 210. Thus, no new logical session can be established any longer between the terminal devices and TSS control program 208 of central processing unit CPU-A 201.

When the command "execute switching (TRSFR command)" is issued by supervision and control program 235, the command interpretation and execution program automatically creates a command to establish a logical session with TSS control program 209 in the replacing central processing unit CPU-B 202 (LOGON command), by using the managing tables 210 which store the message transaction histories for the respective terminal devices delivered previously by the data stream control programs 220 and the respective control program unit states, stores the LOGON command in the message buffer, and shifts control to network control program 211. Thus network control program 211 delivers the command data in the message buffer via line 1 201 to the replacing central processing unit CPU-B 202. When the command data is delivered via the communication control program VTAM to TSS control program 209, the session for the terminal device concerned is established and thereafter $AP_3$ becomes operable.

Of course, central processing unit CPU-B 202 has not been on standby as a spare unit, but performs other jobs in parallel with CPU-A 202. When a failure occurs at central processing unit CPU-A 201, CPU-B 202 instead provides the service of the jobs provided by CPU-A 201.

If a logical session is established with another central processing unit, command interpretation and execution program 230 and data stream control program 220 store the command data sequentially in the message buffer using the message transaction histories stored previously, as in the first embodiment. Thus the terminal devices is restored to their state immediately before they are switched to a replacing central processing unit to be newly used, and is capable of keying in commands through that terminal device.

By performing the above processing operations on all the terminal devices connected to the replaced central processing unit, all the logical sessions are automatically switched.

The structure and operation of the session switching control method according to the particular embodiment will now be described in detail with reference to FIGS. 16-20. It is to be noted that only the structural and operational portions of the particular embodiment different from those of the first embodiment will be described.

Figure 16:
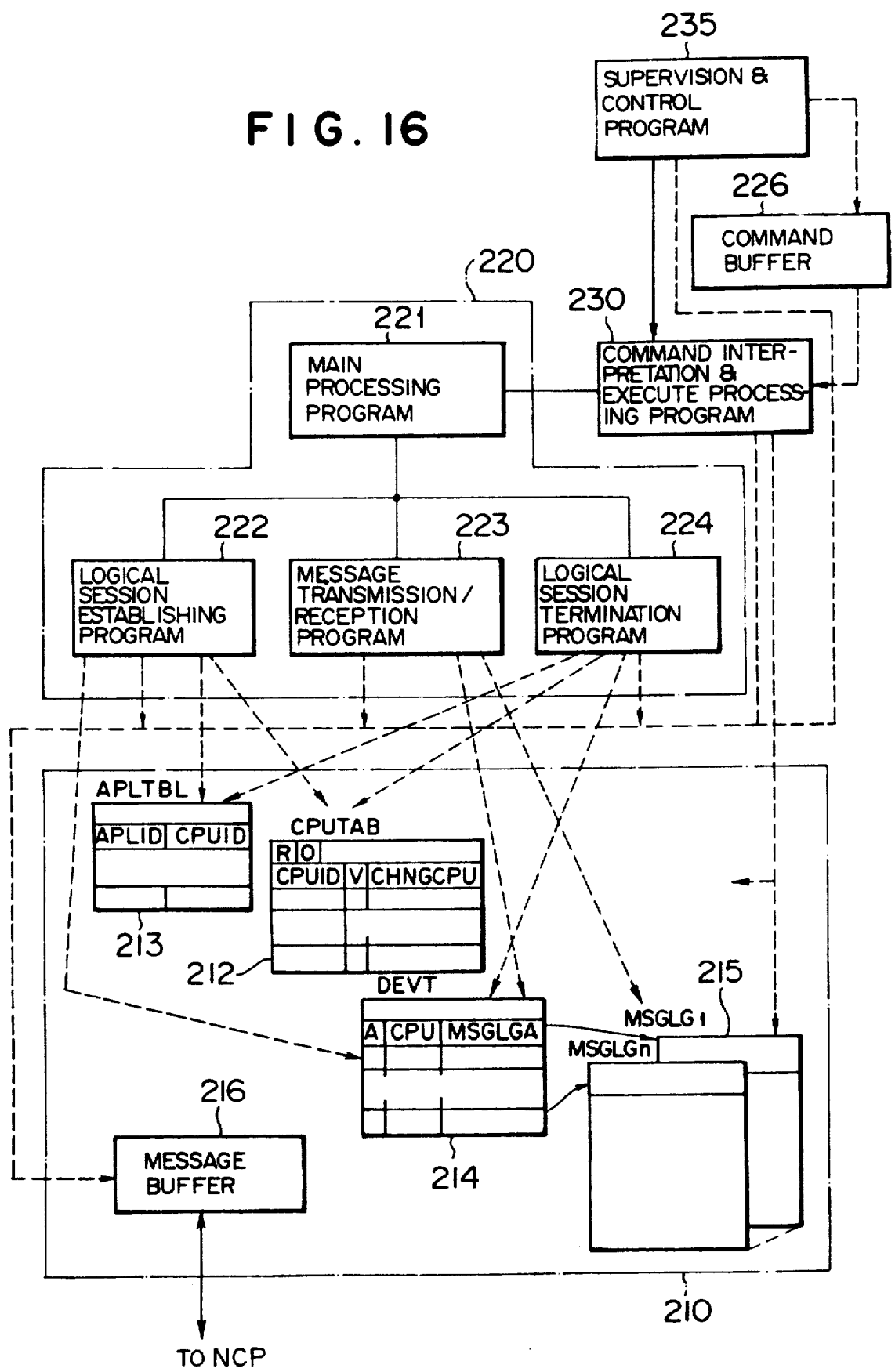
FIG. 16 is a scheme of a group of control programs and a group of managing tables which realize the control method according to the second embodiment.

FIG. 16 corresponds to FIG. 2, which shows the first embodiment, and comprises the combination of the embodiment of FIG. 1 and a supervision and control program 235 and command buffer 226.

Supervision and control program 235 shifts the command data via command buffer 226 to command interpretation and execution program 230, calls command interpretation and execution processing program 230 and as a result, uses data stream control program 220.

Figure 17:
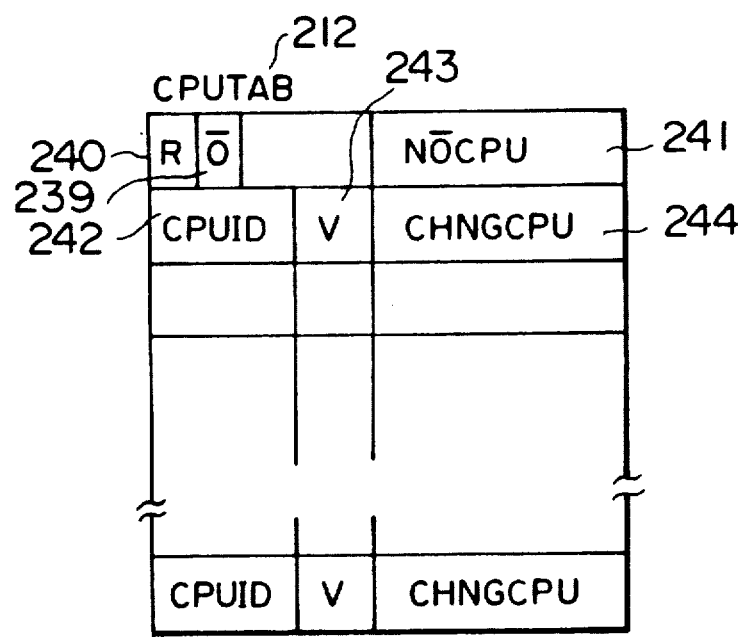
FIG. 17 illustrates the contents of a central processing unit state managing table of FIG. 16.

FIG. 17 illustrates the configuration of central processing unit state managing table 212. Reference numeral 239 denotes an O-flag to indicate a command issued by command unit 205.

The other remaining structural portions of table CPUTAB 212 are the same as the corresponding ones of FIG. 3. The managing table 213 indicative of identification data on application programs and the corresponding central processing units which process the application programs is the same as that in FIG. 4. Furthermore, the structure of terminal state managing table 214 and message transaction history tables $MMGLG_1$-$MMGLG_n$ 215 and the corresponding relationship between both the managing tables are the same as the corresponding ones in FIG. 5.

The operation of the main program section 221 of data stream control program 220 shown in FIG. 16 is the same as the operation flowchart of FIG. 6 except for determination step 1 only which will be described now.

At determination step 1, it is checked whether there was a command for session switching. To this end, R-flag 240 and O-flag 239 in central processing unit state table 212 of FIG. 17 are checked. If either one of R-flag 240 and O-flag 239 is on, command interpretation and execution program are executed. If both R-flag 240 and O-flag 239 are off, step 2 and the subsequent steps are executed.

The operation of the logical session establishing program 222 is the same as that shown in FIG. 7. The structure and operation of message buffer 216 are the same as those in FIG. 8. The operation of message transmission/reception program section 223 is the same as that of FIG. 9, and the operation of logical session terminating program section 224 is the same as that shown in FIG. 10. The series of commands shown in FIG. 11 will be stored in command buffer 226 shown in FIG. 16.

The operation of command interpretation and execution program 230 corresponding to the respective commands shown in FIG. 11 is substantially the same as that shown in FIG. 12. The commands other than the item 4 "execute switching" ("TRSFR" command) shown in FIG. 11 correct the corresponding entries in the respective managing tables, and turn off R-flag 240 and O-flag 230 at step 31.

The processing "execute switching (TRSFR)" is shown in the operation flowcharts of FIGS. 18 and 19.

The processing "execute switching" is the same as that shown in FIGS. 13 and 14 except for the following points.

If count i exceeds entry count (NOCPU) 241 at determination step 34, R-flag 240 and O-flag 239 are turned off and the processing is terminated at step 36.

At step 43 message transaction history table (MSGLG$_n$) 215 indicated by MSGA 254 in the entry is copied into the work area. At determination step 44, it is checked whether the command is from supervision and control program 235 (R-flag is on) or (a command to compulsive switching) from command unit 205 (O-flag is on). As a result of the determination, if the command is from supervision and control program 235 (R-flag is on), the central processing unit used so far is at stoppage now due to failure or the like. Therefore, it is unnecessary to execute logical session terminating program 224. Therefore, control passes to step 46 of FIG. 19.

If it is a command to compulsive switching (O-flag is on), control is shifted to logical session termination program section 224 and the session for the terminal devices concerned is temporarily terminated.

To this end, the data stream of "LOGOFF" is stored in message buffer 216, and termination program 224 is called. The subsequent procedures are the same as procedures 45-54 of FIGS. 13 and 14.

FIG. 20 is a flowchart showing the operation of supervision and control program 235, shown in FIGS. 15 and 16, which operates in communication control processor 200 to supervise at all times the operation/stoppage of the group of central processing units connected to communication control processor 200. When the program 235 detects the stoppage of a central processing unit, it causes the terminal devices which had established their sessions with that central processing unit to automatically establish their new sessions with another central processing unit.

In FIG. 20, supervision and control program 235 waits for a predetermined time interval at step 56, and then checks the respective states of the central processing units entered in the entries in CPUTAB 212.

First at step 57, loop counter i and C-flag are initialized to 0. Loop counter i and C-flag are ensured in the work area of supervision and control program 235.

At step 58, the count of loop counter i is incremented by one and the resulting count is compared with NOCPU 241 in CPUTAB 212. If the count of loop counter i is larger than NOCPU 241, the completion of a check for the state of all the central processing units is meant, and step 69 and the subsequent steps are executed.

If the count of loop counter i is smaller than the value of NOCPU 241, steps 60-68 and command interpretation and execution program 230 are executed. At step 60, CPUID 242 which is the i-th entry in CPUTAB 212 is fetched, and at step 61 a data stream in the form of "LOGONΔCPUID" is created in message buffer 214. Here, CPUID 242 fetched at step 60 is stored in the CPUID field. Next at step 62 the contents of message buffer 214 are requested to be transferred to NCP 211. NCP 211 transfers the data stream to the group of central processing units connected to communication control processor 200. Communication program VTAM in the central processing unit receives and responds to the data stream (step 63).

Therefore, if there is no response from the central processing unit at step 64, it is recognized that the central processing unit designated by CPUID 242 is at stoppage due to failure. At step 67, the item 3 command data of FIG. 11 is created in command buffer 226. At this time, the CPUID 242 in the entry indicated by the loop counter i in CPUTAB 212 is stored in the CPUID field. In order to remember detection of the central processing unit at stoppage at step 68, C-flag is set to "1".

At step 66, R-flag 240 is turned on, control is then shifted to command interpretation and execution program 230 in which V-flag 243 in the entry equal to CPUID 242 in CPUTAB 212 is turned off as shown in FIG. 12 since the command data in command buffer 226 is "DSBLCPU".

If there is a response from the central processing unit, the command data "ENBLCPU" is stored in command buffer 226 at step 65. Control is shifted via step 66 to command interpretation and execution program 230 which turns on V-flag 243 in the appropriate entry in CPUTAB 212.

The steps 58-230 are repeated until the count of loop counter i exceeds the value of NOCPU 241.

If the count of loop counter i exceeds the value of NOCPU 241, the completion of check of all the central processing units connected to communication control processor 200 is meant, and step 69 and the subsequent steps are executed.

Determination step 69 checks whether there is any central processing unit at stoppage in the previous check. If the value of C-flag is not "1", the absence of a central processing unit at stoppage is meant and control returns to step 56.

If the value of C-flag is "1", steps 70 and 71 and command interpretation and execution program 230 are executed to thereby complete automatic switching of a session. First, at step 70 "TRSFR" is stored in command buffer 226 and at step 71, R-flag 240 is turned on. Control is then passes to command interpretation and execution program 230.

Command interpretation and execution program 230 executes item 4 of FIG. 11 since the contents of command buffer 226 are "TRSFR" to thereby switch to a replacing central processing unit indicated by CHNGCPU 244 the group of terminal devices which had established their sessions with the central processing unit CPUID 242 on which the value of V-flag 243 in CPUTAB 212 of FIG. 17 is off. After switching, control returns again to step 56 of FIG. 20.

As will be obvious in FIG. 20, since supervision and control program 235 supervises the respective states of central processing units at all times, it automatically detects the restoration, if any, of the central processing unit from its failure at steps 64 and 65. Thereafter the group of terminal devices can use the restored central processing unit.

As mentioned above, according to the particular embodiment, the communication control processor connected to the plurality of central processing devices includes a control unit for supervising the central processing units at all time, and a second control unit which stores the histories of message transactions for respective terminal devices connected to a particular one of the central processing units, and which automatically delivers the stored message transactions to a replacing central processing unit when there occurs a failure in the particular central processing unit, so that the terminal devices can be automatically switched to the replacing central processing unit used without requiring the terminal users to perform any operations.

While the respective embodiments have been described as using two CPUs, the present invention may be applicable to a network configuration having three or more CPUs.

Also, the present invention may be applicable to a network in which a plurality of terminal devices are connected to a plurality of central processing units via at least two communication control processors.

We claim:

1. A control apparatus for dynamically switching a logical session in an information processing system in which a plurality of terminal devices are connected to a plurality of processing units via at least one communication control processor, each of the processing units executes one or a plurality of programs each of which can be used by any one of the terminal devices, the communication control processor comprising:
   first storage means for storing histories of command data transactions corresponding to the respective terminal devices;
   second storage means for storing first identification data on the processing units connected to the respective terminal devices, second identification data indicative of whether the respective processing units are usable or unusable, and third identification data identifying replacing one of the processing units which can replace the respective processing units; and
   first control means for identifying on the basis of the first identification data, when the second identification data indicates that a processing unit is unusable, a terminal device that is logically connected to the processing unit and has used one of the programs having been executed by the processing unit among the plural programs executed by the processing units, for retrieving from the first storage means histories of command data transactions of the identified terminal device, for automatically creating a first command message to disconnect the logical connection between the processing unit and the identified terminal device, for delivering the first command message to the processing unit, for automatically establishing a logical connection between a replacing processing unit replacing the processing unit and the identified terminal device on the basis of the third identification data stored in the second storage means, for automatically creating a second command message for allowing the identified terminal device to be used continuously on the basis of the previously retrieved histories of command data transactions and delivering the second command message to the replacing processing unit.

2. A control apparatus according to claim 1, further comprising:
   command means connected to the at least one communication control processor; and
   wherein the at least one communication control processor further includes second control means for setting information in the second storage means in accordance with a command from the command means.

3. A control apparatus according to claim 1, wherein, the at least one communication control processor includes second control means for setting information in the second storage means in accordance with a command from the processing units.

4. A control apparatus according to claim 2, wherein the command means commands the second control means to cause one of the second identification data in the second storage means to indicate that the processing unit is unusable.

5. A control apparatus according to claim 3, wherein the commands cause the second control means to cause one of the second identification data in the second storage means to be set so as to indicate that the processing unit is unusable.

6. A control apparatus according to claim 1, wherein the at least one communication control processor further includes:
   third control means for supervising whether the respective processing units connected to the at least one communication control processor are operating; and
   second control means for setting one of the second identification data in the second memory means so as to indicate that the processing unit is unusable when the processing unit is detected as unusable by the third control means.

7. A control apparatus according to claim 6, wherein the third control means issues to the respective processing units at predetermined periods a command to check whether the respective processing units are operating, and wherein the second control means reflects the respective operative states of the processing units in second identification data in the second storage means on the basis of the respective responses from the processing units.

8. A control apparatus according to claim 6, further comprises
   a command buffer storing command data for checking whether the respective processing units are operating or not, wherein
   said third control means issues the command data stored in the command buffer to the respective processing units to check whether the respective processing units are operating or not and detects whether the respective central processing units are unsuable or not on the basis of the respective responses from the processing units.

9. A control apparatus according to claim 1, wherein the second storage means further includes fourth identification data of the processing units executing the respective programs, and the first control means performs the identification operation on the basis of the first and the fourth identification data.

10. A control method for dynamically switching a logical session in an information processing system having a network control system structure comprising a plurality of processing units, a plurality of terminal devices, and at least one communication control processor which connects the plurality of terminal devices to the plurality of processing units, the communication control processor including first storage means for storing histories of command data transactions corresponding to the respective terminal devices and second storage means for storing first identification data on the processing units connected to the respective terminal devices, second identification data indicative of whether the respective processing units are usable or unusable, and third identification data identifying replacing ones of the processing units which can replace the respective processing units, the method comprising the steps of:

identifying on the basis of the first identification data, when the second identification data indicates that a processing unit is unusable, a terminal device that is logically connected to the processing unit and has used by one of the programs having been executed by the processing units among the plural programs executed by the processing units;

retrieving from the first storage means histories of command data transactions of the identified terminal device;

automatically creating a first command message to disconnect the logical connection between the processing unit and the identified terminal device and delivering the first command message to the processing unit;

automatically establishing a logical connection between a replacing processing unit replacing the processing unit and the identified terminal device on the basis of the third identification data stored in the second storage means; and automatically creating a second command message for allowing the identified terminal device to be used continuously on the basis of the previously retrieved histories of command data transactions and delivering the second command message to the replacing processing unit.

11. A control method according to claim 10, wherein the information processing system further comprises command means connected to the at least one communication control processor; and wherein the method further comprises a fifth step of setting information in the second storage means in accordance with a command from the command means.

12. A control method according to claim 11, wherein the setting information step includes a step of setting, in accordance with a command from the command means, one of the second identification data in the second storage means to indicate that the processing unit is unusable.

13. A control method according to claim 10, further comprising a step of setting information in the second storage means in accordance with a command from the processing units.

14. A control method according to claim 13, wherein the setting information step includes a step of setting one of the second identification data in the second storage means so as to indicate that the processing unit is unusable in accordance with a command from the processing units.

15. A control method according to claim 10, further includes:

a step of supervising whether the respective processing units connected to the at least one communication control processor are operating; and a step of setting one of the second identification data in the second storage means so as to indicate that the processing unit is unusable when the processing unit is detected as unusable by the supervising step.

16. A control method according to claim 15, wherein the supervising step issues to the respective processing units at predetermined periods a command to check whether the respective processing units are operating; and wherein the setting one of the second identification data step reflects the respective operative states of the processing units in second identification data in the second storage means on the basis of the respective responses from the processing units.

17. A control apparatus for dynamically switching a logical session in an information processing system having a network control system configuration in which a plurality of terminal devices are connected to a plurality of processing units via at least one communication control processor, the communication control processor comprising:

storage means for storing histories of command data transactions corresponding to the respective terminal devices; and control means for identifying, when a processing unit is unusable, a terminal device that is logically connected to the processing unit and has used any one of programs having been executed by the processing unit among plural programs executed by the processing units, for retrieving the histories of command data transactions of the identified terminal device, the processing unit being a processing unit to be replaced by a replacing processing unit, for delivering to the processing unit to be replaced command data to disconnect the logical connection between the processing unit to be replaced and the identified terminal device, for establishing logical connection between the replacing processing unit and the identified terminal device, and for automatically delivering the retrieved histories of the command data transactions to the replacing processing unit.

* * * * *

UNITED STATES PATENT AND TRADEMARK OFFICE
CERTIFICATE OF CORRECTION

PATENT NO. : 5,121,486

DATED : June 9, 1992

INVENTOR(S) : Jun'ichi Kurihara, Mitaka; Toshio Hirosawa, Machida; and
                  minoru Shibamiya, Yokohama, all of Japan It is certified that error appears in the above-identified patent and that said Letters Patent is hereby corrected as shown below:

In column 17, line 37, claim 1, delete "any".

Signed and Sealed this

Seventh Day of December, 1993

Attest:

BRUCE LEHMAN

*Attesting Officer*  *Commissioner of Patents and Trademarks*